United States Patent

Butler et al.

[11] Patent Number: 5,905,571
[45] Date of Patent: May 18, 1999

[54] OPTICAL APPARATUS FOR FORMING CORRELATION SPECTROMETERS AND OPTICAL PROCESSORS

[75] Inventors: Michael A. Butler; Antonio J. Ricco; Michael B. Sinclair, all of Albuquerque, N.M.; Stephen D. Senturia, Brookline, Mass.

[73] Assignee: Sandia Corporation, Albuquerque, N.M.

[21] Appl. No.: 08/522,202

[22] Filed: Aug. 30, 1995

[51] Int. Cl.⁶ ...................................................... G01J 3/28
[52] U.S. Cl. ............................................. 356/328; 356/326
[58] Field of Search .................................. 356/326, 328, 356/334, 305; 359/375, 369

[56] References Cited

U.S. PATENT DOCUMENTS

| | | | |
|---|---|---|---|
| 3,752,563 | 8/1973 | Torok | 350/151 |
| 3,756,721 | 9/1973 | Williams | 356/80 |
| 3,811,776 | 5/1974 | Blau | 356/51 |
| 3,861,784 | 1/1975 | Torok | 350/162 R |
| 3,955,891 | 5/1976 | Knight | 356/74 |
| 4,011,009 | 3/1977 | Lama | 350/162 R |
| 4,060,326 | 11/1977 | Tirabassi | 356/96 |
| 4,191,473 | 3/1980 | Hansch | 356/328 |
| 4,193,691 | 3/1980 | Fjarlie | 356/330 |
| 4,229,732 | 10/1980 | Hartstein | 340/378.2 |
| 4,563,585 | 1/1986 | Ward | 250/373 |
| 4,636,074 | 1/1987 | Levy | 356/328 |
| 4,676,642 | 6/1987 | French | 356/346 |
| 4,698,602 | 10/1987 | Armitage | 332/7.51 |
| 4,732,476 | 3/1988 | Barshad | 356/328 |
| 4,736,132 | 4/1988 | Culp | 310/333 |
| 4,775,234 | 10/1988 | Shimomura | 356/328 |
| 4,790,654 | 12/1988 | Clarke | 356/328 |
| 4,820,048 | 4/1989 | Barnard | 356/328 |
| 4,838,645 | 6/1989 | Machler et al. | 356/328 |

(List continued on next page.)

OTHER PUBLICATIONS

D. T. Williams and B. L. Kolitz, "Molecular Correlation Spectroscopy," *Applied Optics*, vol. 7, pp. 607–616, Apr. 1968.

J. A. Decker, Jr., "Experimental Realization of the Multiplex Advantage with a Hadamard–Transform Spectrometer," *Applied Optics*, vol. 10, pp. 510–514, Mar. 1971.

T. Izumi and N. Takeda, "Repetitive–Scanning Derivative Spectrometer as a Monitor of Environmental Air Pollution," *Applied Optics*, vol. 22, pp. 3618–3621, 15 Nov. 1983.

R. Vila, A. M. De Frutos, and S. Mar, "Design of Abberation–Balanced High–Efficiency Focusing Holographic Gratings," *Applied Optics*, vol. 27, pp. 3013–3019, 15 Jul. 1988.

(List continued on next page.)

*Primary Examiner*—Frank G. Font
*Assistant Examiner*—Zandra V. Smith
*Attorney, Agent, or Firm*—John P. Hohimer

[57] ABSTRACT

Optical apparatus for forming correlation spectrometers and optical processors. The optical apparatus comprises one or more diffractive optical elements formed on a substrate for receiving light from a source and processing the incident light. The optical apparatus includes an addressing element for alternately addressing each diffractive optical element thereof to produce for one unit of time a first correlation with the incident light, and to produce for a different unit of time a second correlation with the incident light that is different from the first correlation. In preferred embodiments of the invention, the optical apparatus is in the form of a correlation spectrometer; and in other embodiments, the apparatus is in the form of an optical processor. In some embodiments, the optical apparatus comprises a plurality of diffractive optical elements on a common substrate for forming first and second gratings that alternately intercept the incident light for different units of time. In other embodiments, the optical apparatus includes an electrically-programmable diffraction grating that may be alternately switched between a plurality of grating states thereof for processing the incident light. The optical apparatus may be formed, at least in part, by a micromachining process.

40 Claims, 12 Drawing Sheets

U.S. PATENT DOCUMENTS

| | | | |
|---|---|---|---|
| 4,852,079 | 7/1989 | Kinney et al. | 356/328 |
| 4,886,341 | 12/1989 | Oishi et al. | 356/328 |
| 5,061,049 | 10/1991 | Hornbeck | 359/224 |
| 5,112,125 | 5/1992 | Neumann | 356/328 |
| 5,115,344 | 5/1992 | Jaskie | 359/573 |
| 5,280,338 | 1/1994 | Drozdowicz et al. | 356/328 |
| 5,311,360 | 5/1994 | Bloom | 359/572 |
| 5,561,558 | 10/1996 | Shiono et al. | 359/569 |
| 5,565,983 | 10/1996 | Barnard | 356/328 |

OTHER PUBLICATIONS

T. Chen, "Microstructure Fabrication with Implanted Etch Barriers," *Society of Photoinstrumentation Engineers Critical Reviews of Optical Science and Technology*, vol. 1088, pp. 372–374, 1989.

T. Chen, "Wavelength–Modulated Optical Gas Sensors," *Sensors and Actuators B*, vol. 13–14, pp. 284–287, 1993.

C. de Castro Carranza, A. M. de Frutos Baraja, J. A. Aparicio Calzada, F. A. Frenchoso Escudero, S. Caceres Gomez, and J. L.Molpeceres Criado, Holographic Grating with Two Spatial Frequencies for the Simultaneous Study of Two Spectral Profiles, *Applied Optics*, vol. 31, pp. 3131–3133, 1 Jun. 1992.

J. M. Tedesco, H. Owen, D. M. Pallister and M. D. Morris, "Principles and Spectroscopic Applications of Volume Holographic Optics," *Analytical Chemistry*, vol. 65, pp. 441A–449A, 1 May 1993.

H. O. Edwards and J. P. Dakin, "Gas Sensors Using Correlation Spectroscopy Compatible with Fibre–Optic Operation," *Sensors and Actuators B*, vol. 11, pp. 9–19, 1993.

F. Lopez and J. de Frutos, "Multispectral Interference Filters and Their Application to the Design of Compact Non–Dispersive Infrared Gas Analyzers for Pollution Control," *Sensors and Actuators A*, vol. 37–38, pp. 502–506, 1993.

J. de Frutos and J. M. Rodriguez, F. Lopez, A. J. de Castro, J. Melendez, and J. Meneses, "Electrooptical Infrared Compact Gas Sensor," *Sensors and Actuators B*, vol. 18–19, pp. 682–686, 1994.

D. Rossberg, "Silicon Micromachined Infrared Sensor with Tunable Wavelength Selectivity for Application in Infrared Spectroscopy," *Sensors and Actuators A*, vol. 46–47, pp. 413–416, 1995.

J. Melendez, A. J. de Castro, F. Lopez, and J. Meneses, "Spectrally Selective Gas Cell for Electrooptical Infrared Compact Multigas Sensor," *Sensors and Actuators A*, vol. 46–47, pp. 417–421, 1995.

K. E. Petersen, "Micromechanical Light Modulator Array Fabricated on Silicon," *Applied Physics Letters*, vol. 31, pp. 521–523, 15 Oct. 1977.

L. J. Hornbeck, "Deformable–Mirror Spatial Light Modulators," *Society of Photoinstrumentation Engineers Critical Reviews of Optical Science and Technology*, vol. 1150, pp. 86–102, 1989.

J. H. Jerman and D. J. Clift, "Miniature Fabry–Perot Interferometers Micromachined in Silicon for Use in Optical Fiber WDM Systems," *IEEE 1991 International Conference on Solid–State Sensors and Actuators Digest of Technical Papers*, pp. 372–375, 1991.

R. M. Boysel, "A 128 × 128 Frame–Addressed Deformable Mirror Spatial Light Modulator," *Optical Engineering*, vol. 30, pp. 1422–1427, Sep. 1991.

O. Solgaard, F. S. A. Sandejas, and D. M. Bloom, "Deformable Grating Optical Modulator," *Optics Letters*, vol. 17, pp. 688–690, May 1, 1992.

Y. B. Gianchandani and K. Najafi, "A Bulk Dissolved Wafer Process for Microelectromechanical Devices," *Journal of Microelectromechanical Systems*, vol. 1, pp. 77–85, Jun. 1992.

W. C. Tang, M. G. Lim, and R. T. Howe, "Electrostatic Comb Drive Levitation and Control Method," *Journal of Microelectromechanical Systems*, vol. 1, pp. 170–178, Dec. 1992.

M. A. Huff, A. D. Nikolich, and M. A. Schmidt, "Design of Sealed Cavity Microstructures Formed by Silicon Wafer Bonding," *Journal of Microelectromechanical Systems*, vol. 2, pp. 74–81, Jun. 1993.

Y. Zhang and K. D. Wise, "Performance of Non–Planar Silicon Diaphragms Under Large Deflections," *Journal of Microelectromechanical Systems*, vol. 3, pp. 59–68, Jun. 1994.

V. Temesvary, S., Wu, W. H. Hsieh, Y.–C. Tai, and D. K. Miu, "Design, Fabrication, and Testing of Silicon Microgimbals for Super–Compact Rigid Disk Drives," *Journal of Microelectromechanical Systems*, vol. 4, pp. 18–27, Mar. 1995.

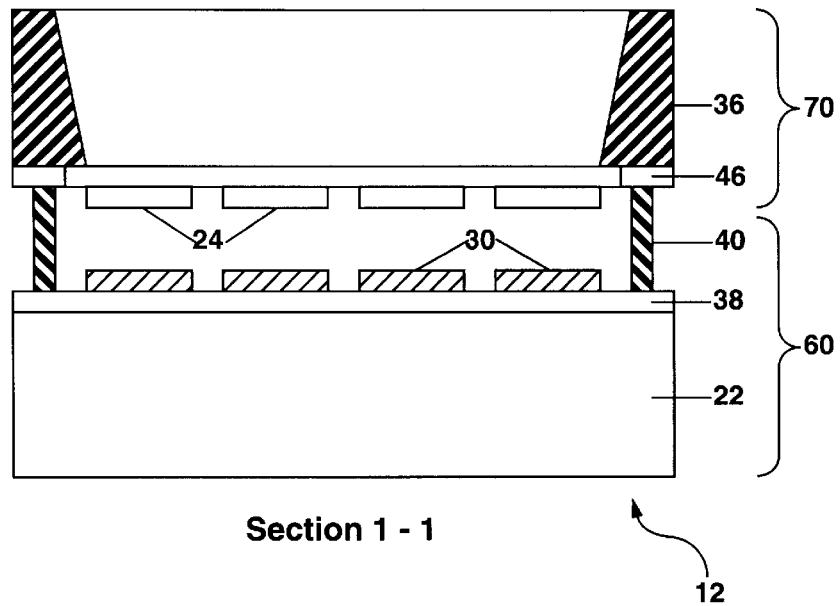
FIG. 5a  Section 1 - 1
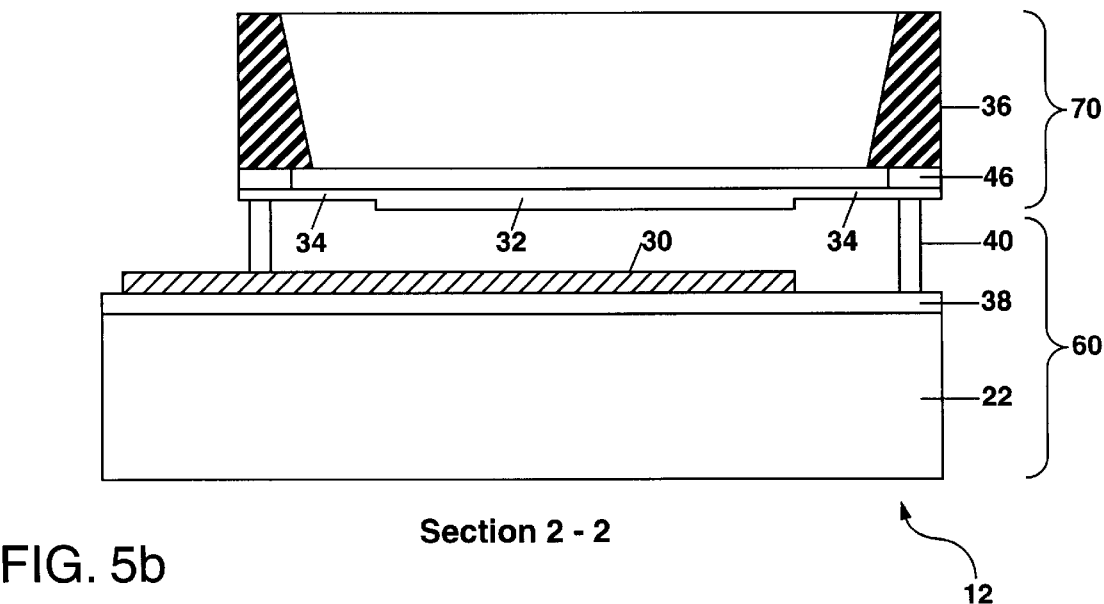
FIG. 5b  Section 2 - 2

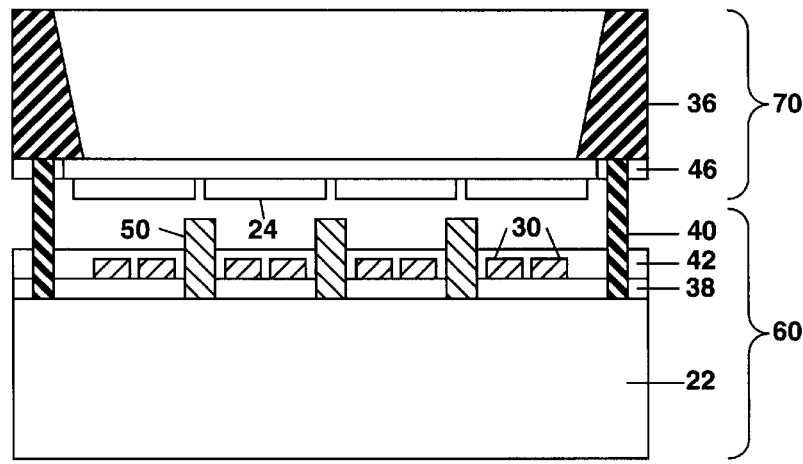
FIG. 9a  Section 3 - 3
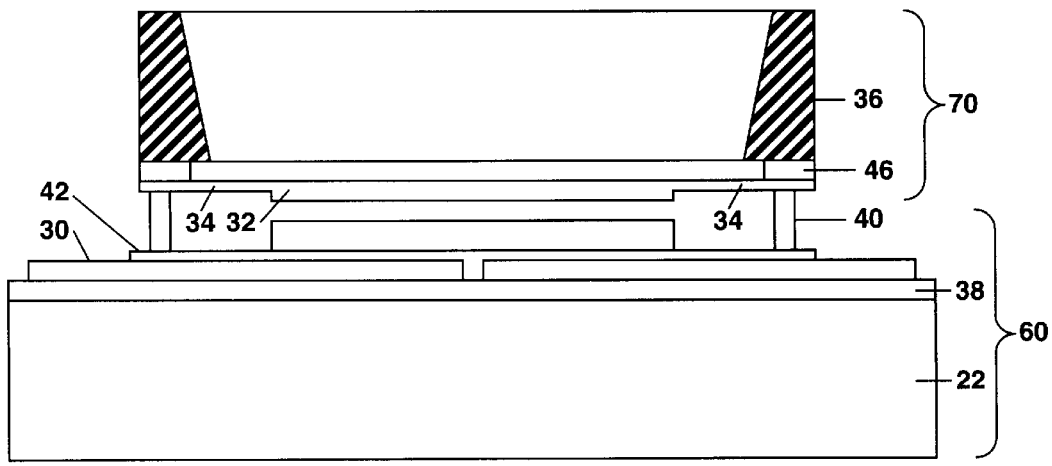
FIG. 9b  Section 4 - 4

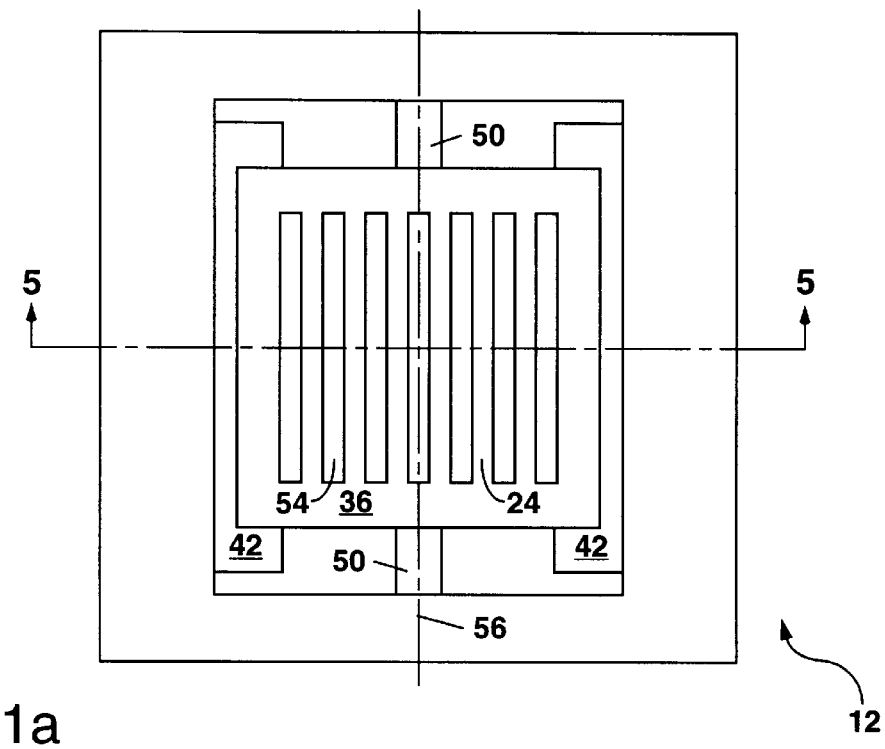
FIG. 11a
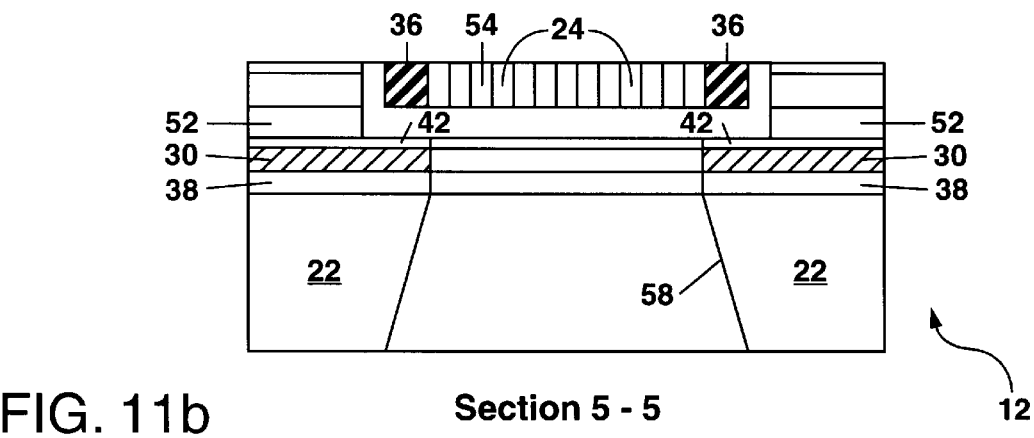
FIG. 11b   Section 5 - 5
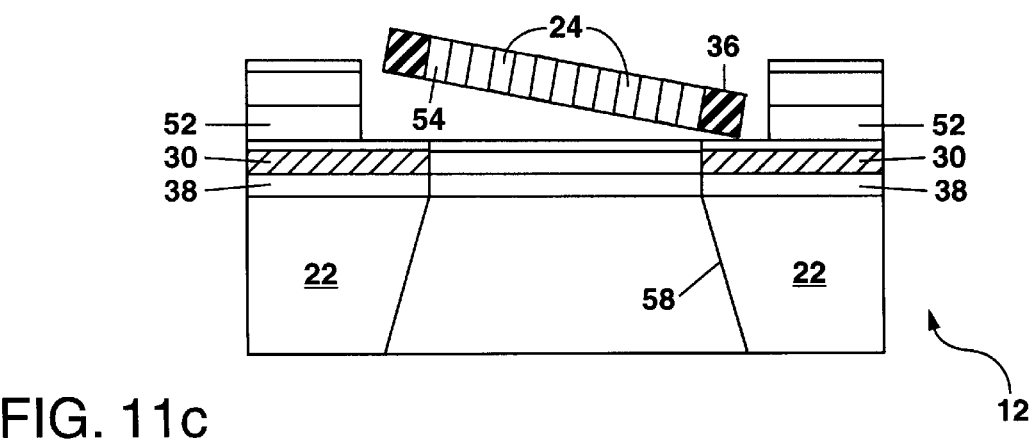
FIG. 11c

OPTICAL APPARATUS FOR FORMING CORRELATION SPECTROMETERS AND OPTICAL PROCESSORS

This invention was made with Government support under Contract No. DE-AC04-94AL85000 awarded by the U.S. Department of Energy. The Government has certain rights in the invention.

FIELD OF THE INVENTION

The present invention relates to optical apparatus that may be used for processing light, and in particular to correlation spectrometers. The present invention also relates to optical processors for use in optical computing, optical information processing, and optical communications.

BACKGROUND OF THE INVENTION

A spectrometer is an optical apparatus for qualitatively and/or quantitatively analyzing materials of interest such as gases, liquids and solids according to a spectral signature characteristic of each material of interest. Correlation spectrometers provide for the analysis of materials of interest by processing polychromatic light from a source that has impressed thereon a spectral signature due to interaction of the light with the materials of interest and processing the light to generate alternately a first correlation with the spectral signature and a second correlation that is different from the first correlation.

A number of correlation spectrometers have been disclosed in the prior art, being either of a non-dispersive type in which the polychromatic light is selectively filtered or of a dispersive type in which the polychromatic light is dispersed for selective detection and analysis thereof.

For example, U.S. Pat. No. 3,811,776 to Blau discloses a non-dispersive correlation spectrometer that provides a first correlation between a particular gas of interest and a sample of the gas of interest, with a second correlation being derived from another pressure broadened sample of the gas of interest.

U.S. Pat. No. 3,955,891 to Knight et al discloses a dispersive correlation spectrometer having Hadamard-matrix spatial filters on the input and exit sides thereof, with a mechanical chopper provided to modulate particular wavelengths of light selected by the spatial filters for detection thereof.

U.S. Pat. No. 4,060,326 to Tirabassi et al discloses a dispersive correlation spectrometer for measuring concentrations of polluting gases on long and short geometric paths. The correlation spectrometer includes a comparison or reference cell containing a known concentration of the gas of interest for calibration of the spectrometer. The spectrometer includes a rotating correlation mask at an outlet focal plane of the spectrometer for sampling different wavelength ranges corresponding to different portions of the absorption spectrum of the gas of interest.

U.S. Pat. No. 4,193,691 to Fjarlie discloses a dispersive correlation spectrometer having a prism for dispersing the light to be analyzed, and a liquid-crystal-cell slit assembly for filtering the dispersed light by means of a pattern of slits formed therein that corresponds to a spectral signature of a material being analyzed.

U.S. Pat. No. 4,563,585 to Ward discloses a dispersive correlation spectrometer having a plurality of rotatable slits at the entrance to the spectrometer for alternately selecting between different wavelengths of light to be passed through the spectrometer.

The correlation spectrometers as described in the prior art are, for the most part, large and bulky. Furthermore, the prior art correlation spectrometers are, for the most part, tailored for the analysis of one or, in some instances, a very few materials of interest since some form of mechanical programming is incorporated into the instruments to provide the correlation, either in the form of gas cells which must be filled with a sample of a particular gas of interest or spatial filters (e.g. correlation masks) which must be photographically formed and precisely located. Thus, the prior art correlation spectrometers must be preprogrammed for the analysis of a very limited number of materials of interest; and are not easily reprogrammed for the analysis of other materials of interest, or for the analysis of a material whose composition is not known beforehand.

An advantage of the present invention is that an optical apparatus may be provided in the form of a correlation spectrometer having at least one diffraction grating programmed for analysis of one or more materials of interest. In some embodiments of the present invention, the diffraction grating may be electrically programmed for the analysis of a material of interest, and subsequently be electrically reprogrammed for the analysis of additional materials of interest. In other embodiments of the present invention, a plurality of diffraction gratings may be provided on a substrate and addressed either in sequence or in parallel for the analysis of many different materials of interest.

Another advantage of the present invention is that the analysis of a material of interest whose exact composition is not known beforehand may be performed with the correlation spectrometer by electrically programming the spectrometer for optically correlating a spectral signature from that material with an atlas containing information about many different materials either stored electronically for use in electrically programming a diffraction grating, or stored as an array of many different addressable diffraction gratings formed on a substrate.

A further advantage of the present invention is that the correlation spectrometer may include one or more diffraction gratings formed on a common substrate for alternately processing light at different wavelengths corresponding to a first spectrum that includes at least a portion of the spectral signature of a material of interest, and a second spectrum shifted in wavelength from the first spectrum.

Still another advantage of the present invention is that an optical apparatus may include one or more diffraction gratings having a plurality of grating elements in a multi-periodic spaced relationship for directing a plurality of wavelengths of light to a common point in space wherein a slit, aperture, optical fiber, or detector means may be located for forming a correlation spectrometer or an optical processor.

Still another advantage of the present invention is that the diffraction gratings may be formed on a substrate as an integrated device.

These and other advantages of the apparatus of the present invention will become evident to those skilled in the art.

SUMMARY OF THE INVENTION

Accordingly, it is a primary object of the present invention to provide an optical apparatus that is compact in size with at least one diffraction grating that may be programmed for the correlation analysis of an incident light beam received from a source.

An additional object of the present invention is to provide a correlation spectrometer that may be electrically programmed for the analysis of different materials of interest.

A further object of the present invention is to provide a correlation spectrometer having an atlas of information about many different materials of interest stored electronically or as an array of diffraction gratings on a substrate for the analysis of a plurality of different materials of interest or for the analysis of a material whose exact composition is not known beforehand.

Another object of the present invention is to provide an optical apparatus having one or more diffraction gratings formed at least in part by a micromachining process.

Still another object of the present invention is to provide a correlation spectrometer having a modulation means for addressing each diffraction grating (i.e. diffractive optical element) to produce for one unit of time a first spectrum of light including at least a portion of a spectral signature of at least one material of interest, and to produce for a different unit of time a second spectrum of light being shifted in wavelength from the first spectrum.

Yet a further object of the present invention is to provide a correlation spectrometer in which the modulation means for addressing each diffraction grating is an addressing element comprising one or more electro-mechanical actuators, electrostatic actuators, or light-beam deflectors.

Additional objects, advantages, and novel features of the invention will become apparent to those skilled in the art upon examination of the following description, or may be learned by practice of the invention. The objects and advantages of the invention may be realized and attained by means of the instrumentalities and combinations particularly pointed out in the appended claims.

To achieve the foregoing and other objects, and in accordance with the purposes of the present invention as described herein, an optical apparatus is provided for processing incident light from a source. The optical apparatus comprises one or more diffractive optical elements (i.e. diffraction gratings) formed on a substrate with each diffractive optical element comprising a plurality of grating elements, preferably in a multi-periodic spaced relatonship. Each diffractive optical element for a unit of time receives and processes light from the source for analysis thereof. The optical apparatus further comprises modulation means for addressing each diffractive optical element to produce for one unit of time a first correlation with the incident light, and to produce for a different unit of time a second correlation with the incident light that is different from the first correlation. The optical apparatus may further include optical means for receiving the incident light from the source and directing the light to each diffractive optical element and/or detector means for receiving the processed light and generating a modulated output signal therefrom. Additionally, the optical apparatus may include signal processing means connected to the modulation and detector means for processing the output signal and thereby recovering information from the incident light. Embodiments of the optical apparatus may be provided as correlation spectrometers and as optical processors.

In some preferred embodiments of the present invention, the optical apparatus is provided in the form of a correlation spectrometer comprising one or more pairs of diffractive optical elements, each pair comprising a first diffractive optical element for intercepting and processing for one unit of time incident light from a source having impressed thereon a spectral response characteristic (i.e. a spectral signature) of one or more materials of interest for producing a first spectrum (providing a first correlation with the incident light) including at least a portion of the spectral response characteristic of each material of interest, and a second diffractive optical element for intercepting and dispersing the light for a different unit of time to produce a second spectrum shifted in wavelength from the first spectrum (i.e. the second spectrum provides a second correlation with each material of interest, and is different from the first correlation). The correlation spectrometer may further comprise detector means for receiving the processed light and generating a modulated output signal therefrom having alternating first and second correlation components, and signal processing means for receiving the modulated output signal and recovering information about each material of interest.

In these preferred embodiments of the optical apparatus of the present invention, the light being analyzed is preferably switched alternately between the first and second diffractive optical elements by modulation means for addressing each diffractive optical element comprising one or more addressing elements selected from the group consisting of electromechanical actuators, electrostatic actuators, and light-beam deflector In other embodiments of the optical apparatus of the present invention, a plurality of pairs of the diffractive optical elements may further be provided on a common substrate as an atlas for sequential or parallel processing of the incident light.

In yet other preferred embodiments of the present invention, the correlation spectrometer may comprise one or more diffractive optical elements formed on a substrate, each diffractive optical element comprising a plurality of grating elements with at least one electrode on the substrate for addressing the grating elements and selecting between at least two grating states including a first grating state being electrically selectable for a unit of time for receiving and processing the light to produce a first spectrum (i.e. representing or providing a first correlation) including at least a portion of the spectral signature of one or more materials of interest, and a second grating state being selectable for a different unit of time for receiving and dispersing the light to produce a second spectrum (i.e. representing or providing a second correlation) shifted in wavelength from the first spectrum. The plurality of grating elements according to one preferred embodiment of the present invention may be independently addressable to control and vary the spaced relationship between the individual grating elements for selecting each of the grating states; whereas in yet another preferred embodiment of the invention, the plurality of grating elements are maintained in a predetermined and fixed spaced relationship and addressed as a whole to select between the grating states. These preferred embodiments of the present invention may further comprise detector means for alternately receiving the first and second spectra and generating a modulated output signal therefrom; and signal processing means for receiving the modulated output signal from the detector and recovering information about each material of interest.

Other objects, advantages and novel features of the invention will become apparent from the following detailed description thereof when considered in conjunction with the accompanying drawings.

BRIEF DESCRIPTION OF THE DRAWINGS

The accompanying drawings, which are incorporated into and form a part of the specification, illustrate several aspects and embodiments of the present invention and, together with the description, serve to explain the principles of the invention. The drawings are only for the purpose of illustrating preferred embodiments of the invention and are not to be construed as limiting the invention. In the drawings:

FIGS. 5a and 5b show cross-section views of the first example of the electrically programmable diffractive optical element along the lines 1—1 and 2—2 in FIG. 4.

FIGS. 9a and 9b show cross-section views of the second example of the programmable diffractive optical element along the lines 3—3 and 4—4 in FIG. 8.

FIGS. 11a shows a plan view and FIGS. 11b and 11c show cross-section views of a third example of an electrically programmable diffractive optical element of the optical apparatus according to FIG. 3b for use in transmission.

DETAILED DESCRIPTION OF THE INVENTION

Figure 1A:
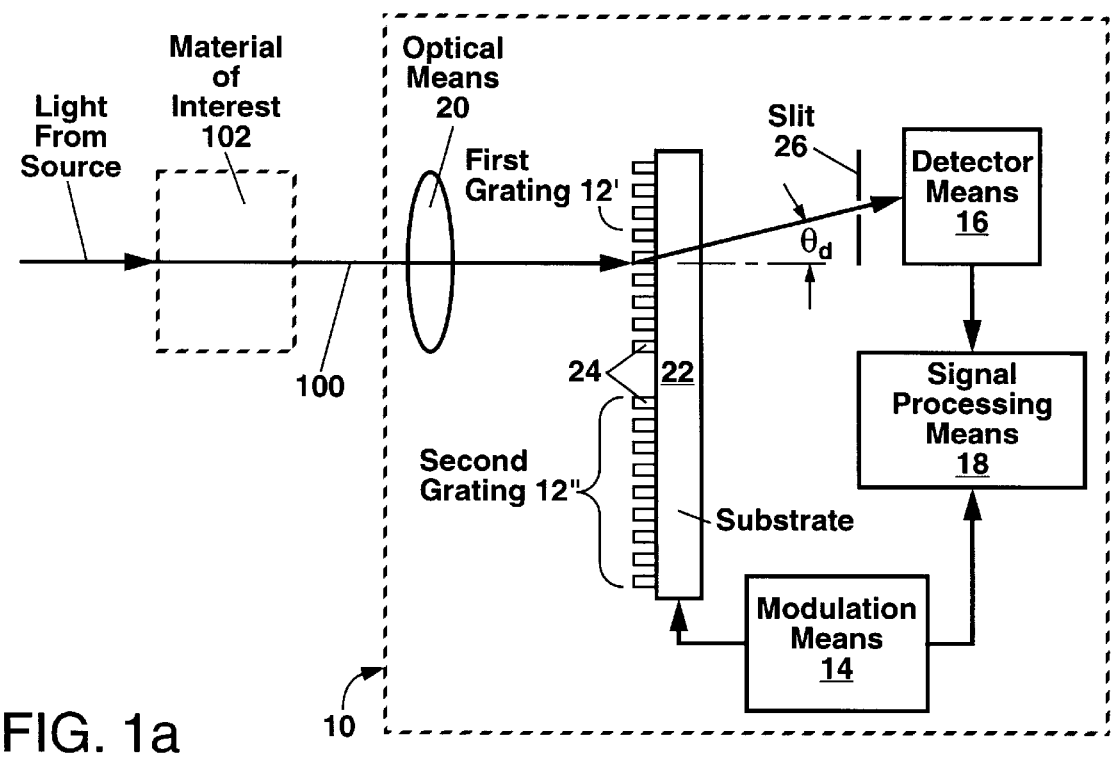
FIGS. 1a and 1b schematically illustrate embodiments of the optical apparatus of the present invention comprising transmission and reflection diffractive optical elements, respectively.

The optical apparatus 10 of the present invention is described with reference to preferred embodiments as correlation spectrometers. However, it will be understood by those skilled in the art that other embodiments of the present invention may be provided as optical processors for use in optical computing, optical information processing, and optical communications.

A first embodiment of the optical apparatus 10 of the present invention is schematically illustrated in FIG. 1. The optical apparatus 10 comprises one or more diffractive optical elements 12 (e.g diffraction gratings 12' and 12" in FIG. 1) for receiving light 100 from a source; and modulation means 14 operatively connected to the diffractive optical elements for alternately processing the light and producing first and second spectra (i.e. first and second optical correlations) from the light. In a preferred embodiment of the optical apparatus 10 in the form of a correlation spectrometer as shown in FIG. 1, the incident light 100 has impressed thereon a spectral signature due to interaction of the light with at least one material of interest 102 to be analyzed by the spectrometer. The optical apparatus 10 may further include detector means 16 for receiving the processed light and generating a modulated output signal therefrom containing first and second correlation components, and signal processing means 18 connected to the modulation and detector means for processing and/or comparing the first and second correlation components from the modulated output signal and thereby recovering information from the incident light (e.g. qualitative and/or quantitative information about each material of interest for correlation spectrometer embodiments of the present invention).

The source of light for use with the optical apparatus may be any source of light as generated by a lamp, glow bar, light-emitting diode, laser or the like that is located within, adjacent to, or distant from the optical apparatus. (Light is defined herein to include any wavelength of optical radiation from the ultraviolet through the infrared regions of the spectrum covering wavelengths from about 0.2 to 20 microns.)

For preferred embodiments of the apparatus as correlation spectrometers, the source of light is preferably polychromatic with a range of wavelengths at least partially overlapping one or more energy bands of a material of interest so that the incident light may be impressed with a spectral signature characteristic of that material. The spectral signature (also termed herein a spectral response characteristic) may comprise an absorption spectrum, emission spectrum, reflection spectrum, scattered light spectrum or the like wherein light from a source is impressed with information characteristic of one or more materials of interest. The source of light in some embodiments of the present invention may be a localized light source such as a lamp, glow bar, light-emitting diode, laser or the like that is located within, adjacent to, or distant from the correlation spectrometer. In other embodiments of the invention, the source of light may be ambient light (including solar radiation). The source of light is generally a separate entity from the material of interest; although in some instances such as plasmas, hot gas plumes, luminescent or heated materials, etc. the source of light may emanate directly from the materials of interest.

Materials of interest that may be analyzed with correlation spectrometer 10 of the present invention may be in the form of gases, liquids, solids, plasmas, and combinations thereof. The light from the source may be directed through or reflected from one or more of the above materials to impress thereupon a spectral signature characteristic of the materials, with the materials being located within a sample cell, within the atmosphere, in outer space (e.g. planetary atmospheres), or in a localized environment (e.g. a smokestack, effluent plume, process stream, process chamber, etc.).

In FIG. 1a, the incident light 100 is received into the optical apparatus 10 for analysis thereof. Optical means 20 are preferably provided for receiving the light and directing the light to one or more diffractive optical elements in the apparatus. The optical means 20 may comprise one or more optical elements known to the art of spectrometry including lenses, mirrors, optical fibers, optical filters (including Fabry-Perot interferometers), slits, apertures or the like for defining a beam of light and for directing the beam of light along a path in the optical apparatus to one or more diffractive optical elements.

Each diffractive optical element 12 (e.g. first grating 12' and second grating 12" in FIG. 1) is formed on a substrate 22 (preferably all the diffractive optical elements are formed on a common substrate) and comprises a plurality of elongate grating elements 24 in a predetermined horizontal and vertical spaced relationship. In the first preferred embodiment of the present invention as a correlation spectrometer 10 in FIG. 1*a*, each diffractive optical element 12 is a transmission grating formed on a substrate 22 that is at least partially transparent over a wavelength range corresponding to a portion of the spectral signature of each material of interest to be analyzed. Suitable substrates for forming transmission gratings in the ultraviolet, visible and infrared regions of the spectrum include glasses, sapphire, diamond, fused silica, crystalline quartz, semiconductors, plastics, and epoxy resins. The substrate may further include anti-reflection coatings on one or more surfaces thereof for increasing the transmission of light through the substrate.

Of particular interest as a substrate material for some embodiments of the present invention for use in the infrared is silicon which is transparent at wavelengths greater than about 1.15 $\mu$m. A silicon substrate is also advantageous for embodiments of the present invention formed by a micro-machining process and/or for embodiments of the invention which include semiconductor components (e.g. transistors, diodes, etc.) integrated on the substrate for addressing the grating elements 24 to select between two or more grating states.

Each diffractive optical element 12 comprises a plurality of grating elements 24 formed on one or more grating layers (e.g. a metal layer) on the substrate, or within the substrate itself. The grating elements 24 are preferably formed as a linear 1×n array of elongate elements in a predetermined horizontal and vertical spaced relationship. For clarity of explanation, the number of grating elements 24 in FIGS. 1–12 are limited; however, each diffractive optical element 12 according to the present invention may have any predetermined number, n, of grating elements up to 1024 or more depending on the particular use of the correlation spectrometer 10 and the desired resolution and sensitivity for analysis of particular materials of interest.

The horizontal and vertical spaced relationship of the grating elements 24 may be periodic with adjacent grating elements having a uniform height and being spaced by a periodicity, d, that satisfies the grating equation:

$$d(\sin\theta_i + \sin\theta_d) = n\lambda$$

where $\theta_i$ is the angle of incidence of the light beam 100 (as measured from the normal to the substrate 22), $\theta_d$ is the angle of diffraction of the light beam after transmission or reflection from the diffractive optical element 12 (also measured from the normal to the substrate), n is an integer, and $\lambda$ is a particular wavelength of the light (e.g. a center wavelength of the spectral signature of a particular material of interest).

Figure 12A:
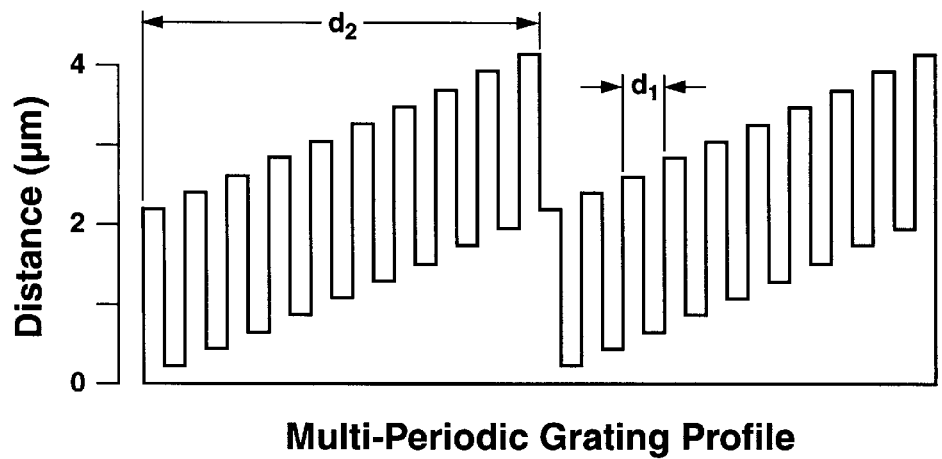
FIGS. 12a and 12b show a preferred embodiment of a diffractive optical element according to the present invention comprising a plurality of grating elements in a multi-periodic spaced relationship for use in forming a correlation spectrometer and a first spectrum generated therefrom, respectively, for use in analyzing gaseous carbon dioxide as a material of interest.

In some preferred embodiments of the present invention, the grating elements 24 have a multi-periodic spaced relationship with a plurality of different periodicities $d_1, d_2 \ldots d_m$ and a varying height of adjacent grating elements. An example of such a multi-periodic diffractive optical element is shown in the example of FIG. 12. In FIG. 12*a*, a partial view of a reflection diffraction grating is shown, with the grating having a first periodicity, $d_1$, between adjacent grating elements 24 and a second periodicity, $d_2$, with a spacing that is 9.5 times the spacing of the first periodicity in this example (and a height of the grating elements that varies in a stair-step manner over the second periodicity, $d_2$). (In the example of FIG. 12, a grating profile determined by the horizontal and vertical spaced relationship of the grating elements must satisfy a modified grating equation as described hereinafter that includes additional terms representing a vertical spaced relationship, s, between adjacent grating elements for satisfying amplitude and phase relationships of the light reflected from the grating.)

Such a multi-periodic diffractive optical element 12 may be advantageous for generating a first spectrum of light in which different wavelengths of light ($\lambda_1, \lambda_2, \ldots \lambda_m$) are overlapped or collocated in space with a substantially identical angle of diffraction, $\theta_d$. In this way, a plurality of spectral bands or peaks having different center wavelengths may be transmitted through a single slit 26 (or alternately an aperture or optical fiber) to the detector means 16. The detection of a plurality of spectral peaks in this manner is advantageous for increasing the sensitivity and selectivity for analysis of a particular material of interest.

Figure 12B:
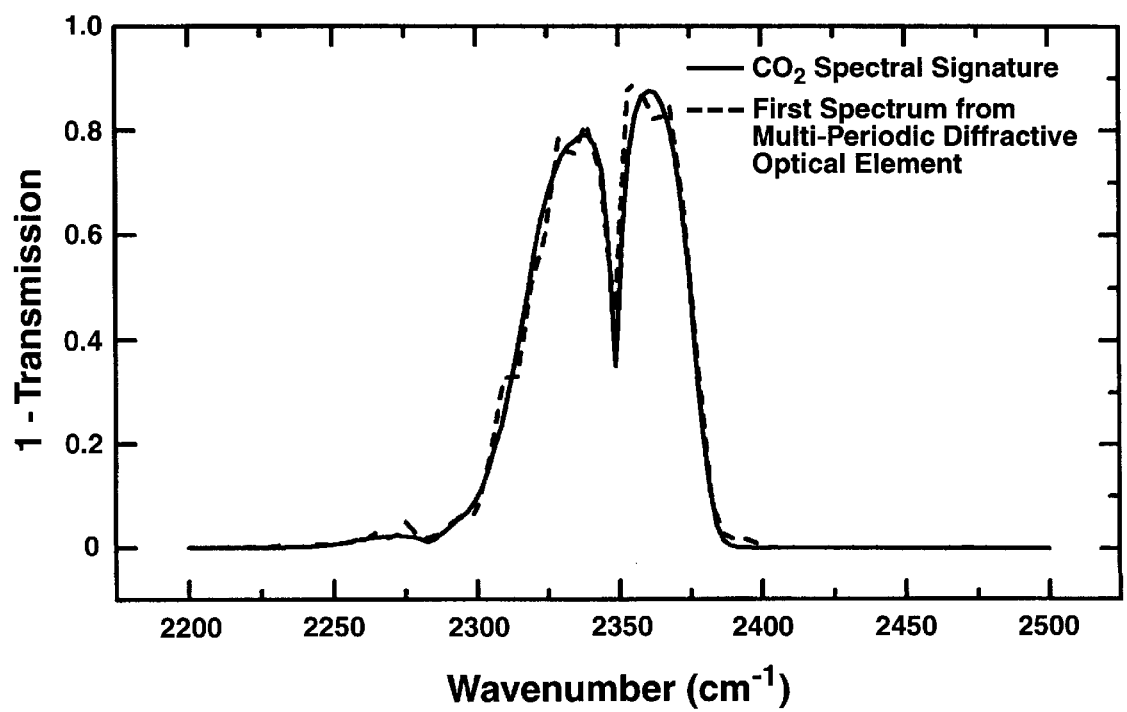

The spaced relationship of the grating elements in a multi-periodic grating such as shown in FIG. 12*a* may be determined, for example, by use of a phase-retrieval algorithm for calculating a phase profile for the grating elements to provide a single predetermined angle of diffraction, $\theta_d$, for a multi-peaked spectral signature such as that shown for gaseous carbon dioxide in FIG. 12*b*. For a preselected fixed angle of incidence (e.g. $\theta_i=0$) the phase-retrieval algorithm may proceed by requiring that collimated light from a broadband light source (i.e. light that is spatially and spectrally uniform) incident on the diffractive optical element 12 produce a diffracted-light spectrum (i.e. the first spectrum) about the angle of diffraction, $\theta_d$, that approximates a predetermined spectral signature corresponding to one or more materials of interest to be analyzed (see FIG. 12*b*). The phase-retrieval algorithm then proceeds with a series of iterative Fourier transforms and inverse Fourier transforms between x-space (defined herein as positional space measured along the cross-section profile of the grating elements as shown in FIG. 12*a*) and u-space defined herein by the variable, u, given by:

$$u = \frac{\sin\theta_d}{\lambda}$$

where $\theta_d$ is the angle of diffraction and $\lambda$ is a particular wavelength of light in the first spectrum. Thus, for a fixed wavelength, $\lambda$, the variable, u, varies with the angle of diffraction, $\theta_d$; and for a fixed angle of diffraction, u varies with the wavenumber (i.e. inverse wavelength) of the light. For the phase-retrieval algorithm, the angle of diffraction, $\theta_d$, is held constant to simulate a fixed spatial position of a slit 26 or the like which is preferable in the correlation spectrometer 10.

Calculation begins by transforming the predetermined first spectrum (e.g. the intensity vs. wavenumber for a particular material of interest to be analyzed as shown, for example, by the solid-line spectral signature of gaseous carbon dioxide in FIG. 12*b*) into a target u-space amplitude profile. This is achieved by calculating the square-root of the intensity (note that the amplitude is equal to the square-root of the intensity) for each value of the variable, u. The target u-space profile is Fourier transformed to determine a phase profile and an amplitude profile of the light at the position of the grating. (Note that the grating profile may be determined from a final value of the phase profile after repeated iterations of the Fourier-transform procedure). After this first iteration, the calculated phase profile in x-space is retained, and the amplitude profile in x-space is replaced by a uniform-intensity profile corresponding to the incident light in the collimated beam. This x-space function (i.e. phase and amplitude as a function of distance along the grating profile)

is then Fourier transformed back into u-space wherein the phase information is retained and the amplitude information is replaced by the predetermined first spectrum. The procedure is iterated until a predetermined level of convergence is obtained. The resulting pattern of phase delays in x-space may then be used for obtaining the required grating profile (i.e. the horizontal and vertical spaced relationship of the grating elements) for use of the spectrometer for analyzing the particular materials of interest.

In some instances wherein potential spectral interferences may occur due to spectral signatures of materials not of interest overlapping the spectral signatures of materials of interest, it may be desirable to design the diffractive optical element 12 so as provide a first spectrum that includes only a portion of the spectral signature of the materials of interest, leaving out those portions of the spectral signature of the materials not of interest or portions of the spectral signature for which undesirable spectral interferences may occur. Furthermore, in calculating the grating profile for a group of materials of interest, the spectral signatures may be weighted by the relative proportions of the various materials expected to be present within a sample volume to provide an improved sensitivity for the group, or to provide an improved indication for a particular condition or activity that is being analyzed or detected (e.g. fugitive or pollution emissions; internal combustion engine emissions; illicit drugs, chemicals, contraband, or explosives; thermal emission signatures from aircraft and rockets; planetary atmospheres; industrial process or waste materials; etc.)

In other embodiments of the present invention the detector means 16 may be an array detector (e.g. a linear 1×n array of detector elements) with one or more or detector elements defining a portion of the dispersed light to be detected thereby eliminating the need for a slit, aperture or the like for spatially filtering the dispersed light, or allowing a plurality of preselected wavelengths of the light to be detected simultaneously.

In the example of FIG. 12a, the multi-periodic spaced relationship of the grating elements (with $d_1$=14 $\mu$m, $d_2$=133 $\mu$m, and an overall grating width of 7 mm) provides a first spectrum as shown by the dashed line in FIG. 12b that closely approximates the spectral signature of $CO_2$ near 2350 $cm^{-1}$. Thus, such a multi-periodic diffractive optical element 12 may be used as a first grating 12' for processing light containing a spectral signature for $CO_2$ and generating a high degree of correlation therewith as evidenced by each spectral band in the processed light being directed to about the same angle of diffraction, $\theta_d$, and thereby generating a relatively large first correlation component within the output signal from the detector means.

In the first embodiment of the present invention in FIG. 1a, a second grating 12" is located adjacent to the first grating 12'. The second grating is formed in a manner similar to the first grating except for a slightly different grating profile to provide a predetermined wavelength shift in the detected light (and therefore a second correlation component different from the first correlation component).

The grating elements may be formed by any processes known to the art of diffraction gratings including ruling, replication, photodefinition, etching, or the like. For preferred embodiments of the present invention employing a silicon substrate, the grating elements are preferably defined by a photolithographic masking process in a resist layer followed by wet or dry etching to transfer the grating pattern to the underlying grating layer or to the substrate. (Multiple masking steps may be used to provide a stair-step shape to the grating elements as shown in the example of FIG. 12a.)

Electron beam lithography may also be used for defining grating elements 24 with a greater precision than optical lithography or with a smaller spacing between the elements (e.g. for use in the ultraviolet).

According to the first embodiment of the present invention shown in FIG. 1a, at least one pair of diffractive optical elements are formed on the substrate, with each pair comprising a first grating 12' (i.e. a first diffractive optical element) and a second grating 12" (i.e. a second diffractive optical element). In other embodiments of the optical apparatus of the present invention as shown, for example, in FIGS. 3–11 the first and second gratings may be formed from different grating states (as defined by predetermined vertical spaced relationships of the grating elements) of a single diffractive optical element 12 as will be described hereinafter.

In the first embodiment of the present invention in FIG. 1a, a modulation means 14 is provided for addressing each diffractive optical element 12 to alternately position the first grating 12' and the second grating 12" to intercept the light 100. Thus, for one unit of time the first grating is located to intercept the light 100 and to produce therefrom a first spectrum of light (i.e. representing a first correlation with the incident light). Subsequently, the first grating is removed from the beam of light and the second grating is positioned to intercept the light to generate for a different unit of time a second spectrum of light that is shifted in wavelength from the first spectrum (i.e. representing a second correlation with the incident light that is different from the first correlation). (The phrase "shifted in wavelength" as used herein refers to any spectral change in the processed light that produces a second correlation component that is different from the first correlation component in the output signal from the detector means, and may include an actual wavelength shift of the detected light or any narrowing or broadening of a spectrum of the processed light that affects the detected light.) In this way, the electrical output signal generated within the detector means 16 is modulated with a first correlation component generated in response to the first spectrum and with a second correlation component generated in response to the second spectrum. This allows the use of synchronous detection (e.g by the signal processing means 18) for comparing or separating the first and second correlation components from the modulated output signal and recovering information about one or more materials of interest.

The modulation means 14 comprises at least one addressing element such as an electro-mechanical actuator, an electrostatic actuator, a light-beam deflector, or the like. In some embodiments of the present invention, the first and second gratings may be physically moved to alternately intercept the beam of light 100, with the motion preferably being cyclic at a predetermined modulation frequency. Such movement of the diffractive optical elements may be accomplished, for example, by rotation of the substrate 22 by a motor operatively connected thereto, or by a linear motion of the substrate by a linear actuator such as a linear motor, solenoid, cam, piston or the like.

Figure 2A:
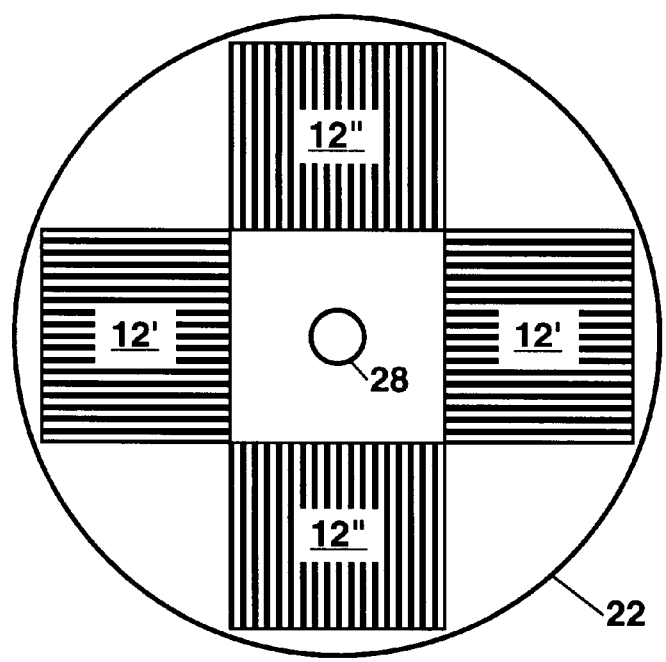
FIGS. 2a and 2b illustrate a plurality of diffractive optical elements formed on substrates for addressing and use in the optical apparatus according to the present invention.

FIG. 2a shows an example of a common substrate having a plurality of diffractive optical elements comprising first gratings 12' and second gratings 12" arranged radially about a central opening 28 for mounting on a hub or shaft for rotation by a motor. In the example of FIG. 2a, the rotary motion of the substrate 22 is preferably a stepped motion with each diffractive element being moved into position to intercept the beam of light 100 and held stationary for a unit of time that may vary from a fraction of a second to several seconds or more depending upon a response time of the detector means 16 and/or a signal integration time of the signal processing means. After that unit of time for measurement of a response signal (e.g. a first correlation due to a first spectrum of the processed light), the substrate is rotated to bring an adjacent diffractive optical element into position for intercepting the light and another measurement is made for another unit of time (e.g. due to a second spectrum of the processed light). In this manner, a rotation of the substrate may provide for the generation of a modulated output signal from the detector means 16.

According to the present invention, the substrate 22 may have a diameter of up to several inches or more for use with a separate driving motor. Alternately, in other embodiments of the present invention, the substrate 22 may have a much smaller diameter (down to a few millimeters) for forming the diffractive optical element by a micromachining process (e.g. a micromachined silicon substrate or a plurality of micromachined diffractive optical elements formed on a silicon wafer). The size and shape of each diffractive optical element formed on the substrate will in general depend upon several factors including a wavelength or wavelength range for operation of the optical apparatus 10, and predetermined spectral resolution and sensitivity requirements for processing of the incident light. In some low-resolution embodiments of the present invention, each diffractive optical element may have a size of about 100 $\mu$m×1 mm; whereas very high-resolution embodiments of the invention may have sizes up to one inch square or larger.

A micromachined substrate 22 may be operatively connected to an electrostatic micromotor formed integrally on or within the substrate according to the art of micromachining. A micromachined substrate 22 may even be shaped by photolithography and etching to form a rotor of an electrostatic micromotor, with the plurality of diffractive optical elements being located or spaced so that an electrostatic stepped motion of the micromotor may be used to accurately bring each diffractive optical element into alignment with the beam of light 100, for forming a very compact correlation spectrometer 10.

Figure 2B:
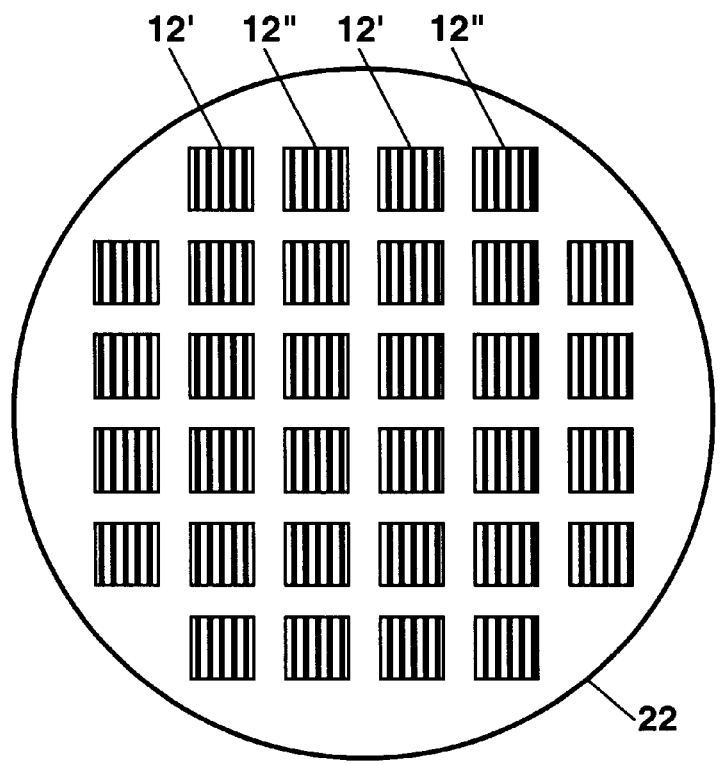

FIG. 2b shows another example of a common substrate having a plurality of diffractive optical elements formed thereon, with the diffractive optical elements comprising first gratings 12' and second gratings 12" arranged side by side in an array. In the example of FIG. 2b, the diffractive optical elements may be alternately aligned to intercept the beam of light 100 for a unit of time by modulation means 14 comprising a linear actuator connected to the substrate or to a moveable platform or stage holding the substrate. The size, shape, and orientation of the diffractive optical elements may be varied from that shown in the example FIG. 2b depending upon particular wavelength, resolution, and sensitivity requirements for use of the correlation spectrometer 10. Alternately, the modulation means 14 may be a light-beam deflector such as a rotatable mirror, prism, transmission plate or the like for periodically redirecting the light beam between the first and second diffractive optical elements.

The correlation spectrometer in the example of FIG. 2b may further include selection means for selecting the pair of diffractive optical elements from a plurality of pairs of diffractive optical elements arrayed on the common substrate. For example, the selection means may include a computer connected to the modulation means 14 for programming the modulation means 14 to alternate between a preselected pair of diffractive optical elements in response to an input to the computer for selecting a particular material of interest to be analyzed. As another example, the selection means may program the modulation means 14 to step through a plurality of pairs of first and second diffractive optical elements forming an analysis atlas, with each pair of diffractive optical elements being programmed for analysis of the spectral signature of a different preselected material of interest. In this manner, the correlation spectrometer may be used to analyze a sample for the presence and quantity of a number of materials of interest in turn until the materials comprising the sample are determined; or to analyze a large number of samples in turn with the analysis information being recorded for later display or use. In this example, the plurality of pairs of the diffractive optical elements may be addressed either sequentially or in parallel. Parallel analysis may be performed, for example, by forming a plurality of correlation spectrometers 10 with each correlation spectrometer being formed about a pair of diffractive optical elements on the substrate.

The detector means 16 according to the present invention comprises at least one light detector such as a photoelectric detector (e.g. a photomultiplier tube), a semiconductor detector, a pyroelectric detector, or a thermal detector. Suitable semiconductor detectors for use with the present invention may include silicon, germanium, gallium arsenide, indium arsenide, indium gallium arsenide, indium antimonide, lead sulfide, lead selenide, or mercury cadmium telluride, or the like. The selection of a particular detector for use with the correlation spectrometer may depend upon a wavelength range of use of the spectrometer that includes one or more spectral signatures corresponding to the materials of interest to be analyzed. Additional factors such as the detector sensitivity and response time may considered when choosing a particular detector for use with the apparatus 10. In some embodiments of the present invention, the detector means 16 may include an array of detectors, with each detector being located and spaced to receive light having a particular wavelength or band of wavelengths as determined at least in part by the diffractive optical elements.

The correlation spectrometer embodiment of the optical apparatus as shown in FIG. 1a preferably further comprises signal processing means 18 connected to the modulation means 14 and the detector means 16 for recovering information about each material of interest. The signal processing means 18 preferably receives as a first input a control signal from the modulation means 14 to provide an indication of a modulation frequency and phase of the alternating first and second spectra of the processed light. The signal processing means also preferably receives as a second input the modulated output signal from the detector means. The signal processing means may include a lock-in amplifier or the like as known to the art of synchronous detection and signal processing for receiving the first and second inputs and generating a measure of the first and second correlation components for qualitatively and/or quantitatively analyzing one or more materials of interest. Alternately the signal processing means may include a computer or the like for digitizing the modulated output signal from the detector means and processing the output signal according to a predetermined algorithm for recovering qualitative and/or quantitative information about one or more materials of interest.

The signal processing means 18 may further include a display or readout for displaying or recording one or more outputs derived from the output signal from the detector means to provide analysis information (e.g. identity, composition, concentration, etc.) about one or more materials of interest. In some embodiments of the present invention, the signal processing means 18 may be integrated at least in part with the diffractive optical elements (e.g. as an integrated circuit formed on a silicon substrate containing one or more micromachined diffractive elements and modulation means therefor). In other embodiments of the present invention, the signal processing means 18 may be in the form of one or more stand-alone instruments (e.g. a lock-in or tuned amplifier, computer, recording or digitizing device, display device etc.) electrically connected to the correlation spectrometer for receiving inputs therefrom (i.e. the first and second inputs from the modulation means and detector means, respectively) and recovering information about each material of interest.

Figure 1B:
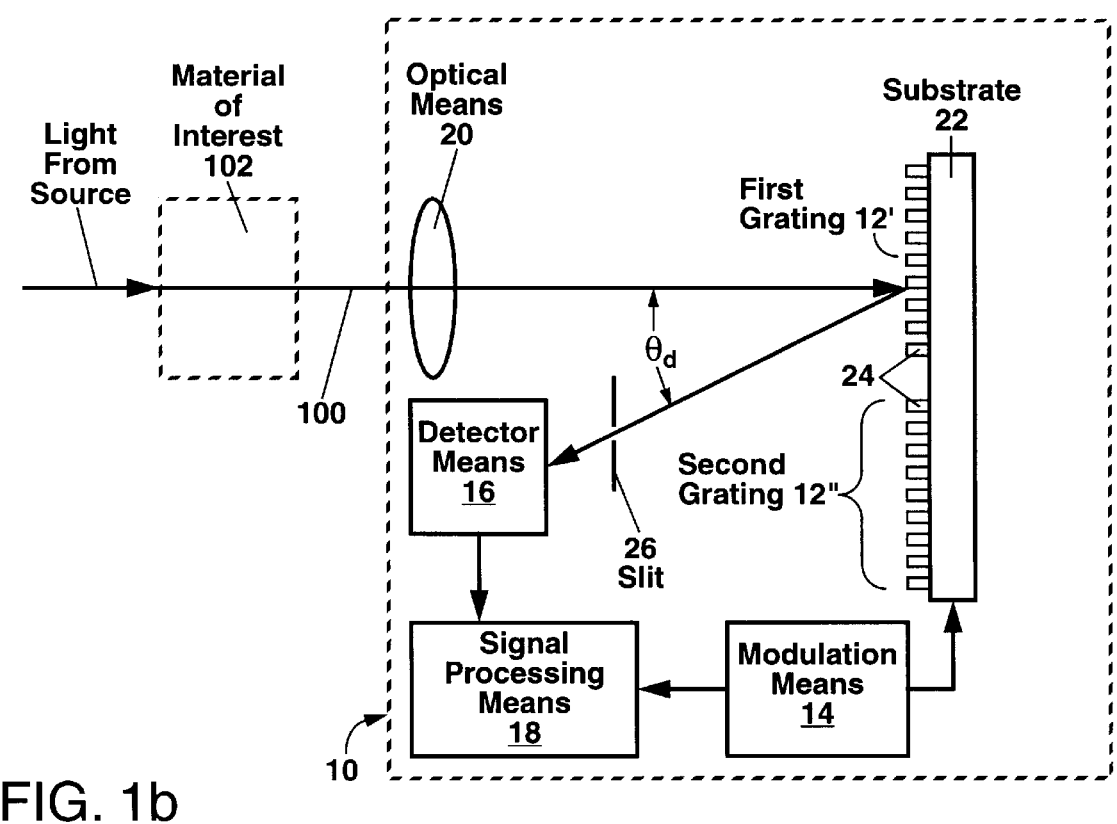

FIG. 1*b* shows a second embodiment of the optical apparatus of the present invention in which the diffractive optical elements 12 operate in reflection rather than in transmission as in FIG. 1*a*. In FIG. 1*b*, the first and second gratings may be formed in a manner similar to that described previously (e.g. by ruling, replication, photodefinition, etching, or the like), with the reflection gratings having a light-reflective upper surface.

The types of substrate materials suitable for forming the reflection gratings (12' and 12") of the second embodiment of the present invention in FIG. 1*b* may include the substrate materials described heretofore for forming transmission gratings. However, there is no requirement that the substrate 22 be at least partially transparent for forming a reflection grating. Therefore, the substrate may also be formed from opaque materials including metals such as aluminum or the like.

The use of one or more reflection diffractive optical elements for forming the correlation spectrometer 10 may be advantageous for increasing a wavelength range of use of the spectrometer, for allowing a greater selection of substrate materials for forming the diffractive optical elements, or for allowing a particular substrate material to be used for forming diffractive optical elements that operate at any preselected wavelength range from the ultraviolet to the infrared by coating the light-reflective upper surface of the gratings with a reflective coating such as thin layer (e.g. about 50–100 nanometers or more) of a metal such as aluminum, gold, silver, nickel, tungsten, or alloys thereof. The grating elements 24 of each diffractive optical element 12 may also be blazed to increase the diffraction efficiency at a predetermined blaze angle which preferably corresponds to about the angle of diffraction, $\theta_d$.

The remaining elements of the second embodiment of the present invention in FIG. 1*b* are similar in design and function to the corresponding elements in FIG. 1*a* as described heretofore; and the examples of FIG. 2 also apply to the second embodiment when the transmission gratings therein are replaced by reflection gratings. For use of the apparatus 10, the first and second reflection gratings (12' and 12") are alternately inserted into the path of the light 100 in response to the modulation means 14 for producing for one unit of time a first spectrum of processed light including at least a portion of the spectral signature of each material of interest being analyzed, and for producing for a different unit of time a second spectrum shifted in wavelength from the first spectrum. The light diffracted from each reflection grating is received by the detector means 16 located as shown in FIG. 1*b* for generating an output signal that may be processed by the signal processing means for recovering information about each material of interest.

Figure 3A:
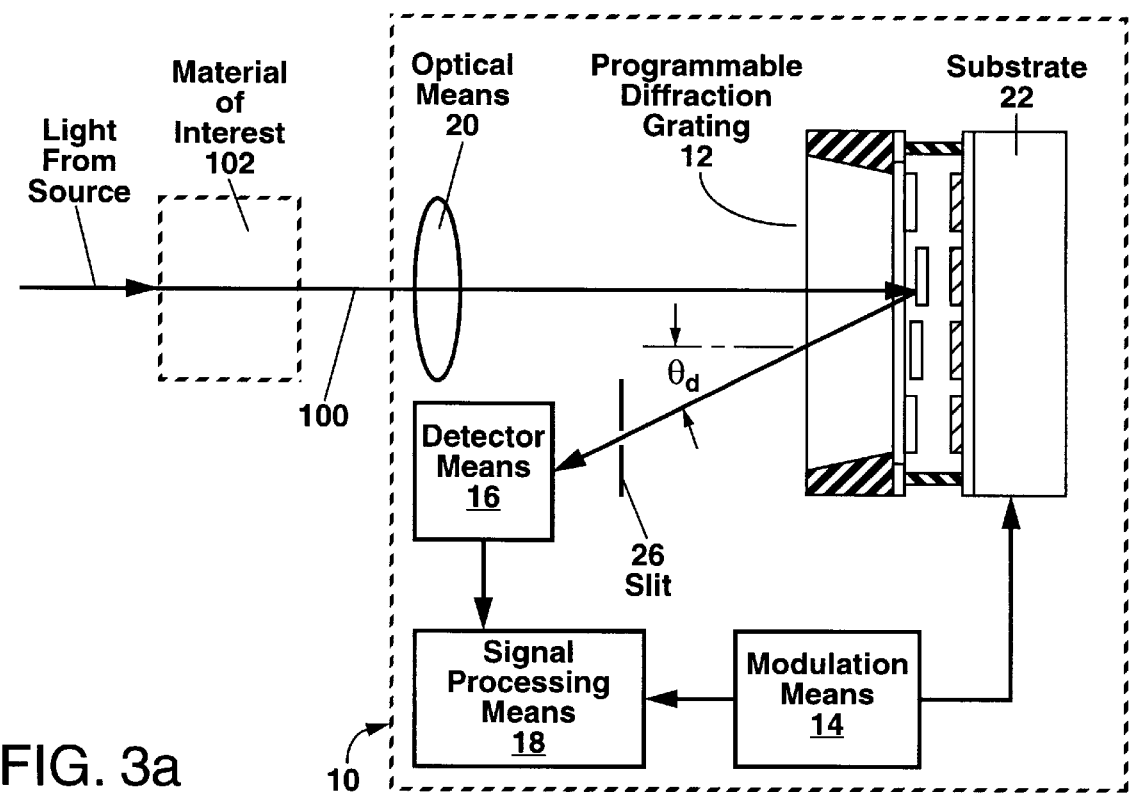
FIGS. 3a and 3b schematically illustrate embodiments of the optical apparatus according to the present invention comprising diffractive optical elements that are electrically programmable for switching between two or more grating states.
Figure 3B:
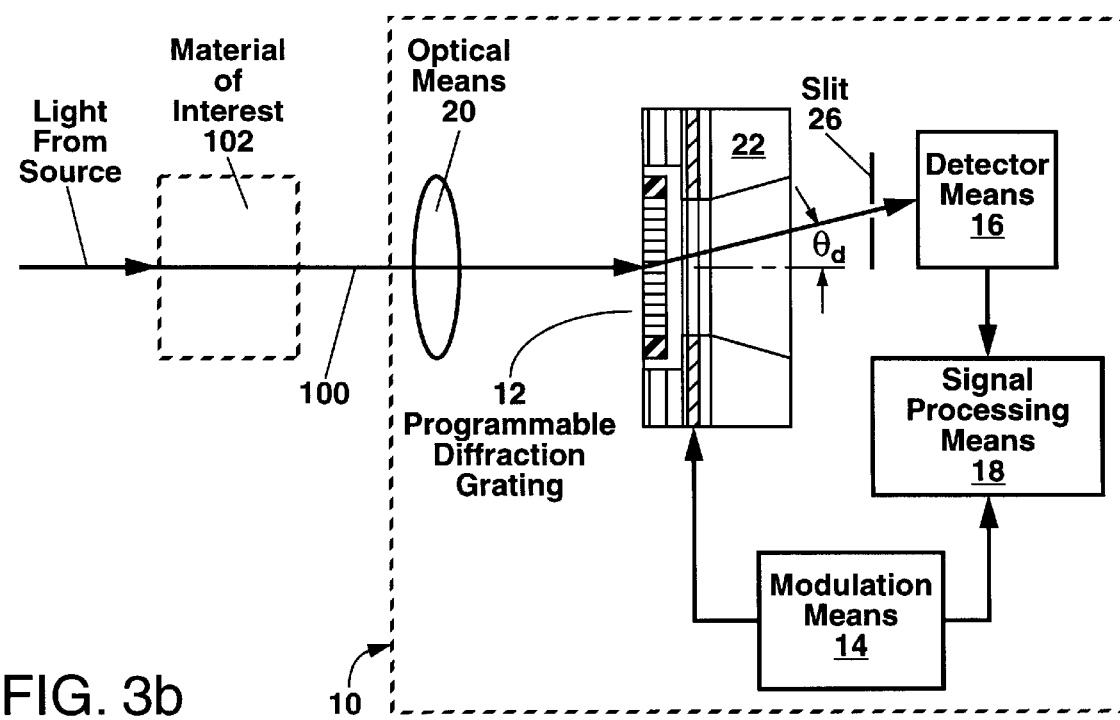

FIGS. 3*a* and 3*b* show third and fourth embodiments of the present invention, respectively, wherein only a single programmable diffractive optical element (i.e. a programmable diffraction grating) is required for forming the optical apparatus 10 shown as a correlation spectrometer. (A plurality of correlation spectrometers or optical processors, however, may be formed on a single substrate 22.) The diffractive optical element 12 in FIGS. 3*a* and 3*b* is programmable by a modulation means 14 comprising one or more addressing elements in the form of electrostatic actuators that may be electrically activated or programmed to alternate between at least two grating states (each grating state being defined herein as a particular spaced relationship of the plurality of grating elements in a vertical direction normal to the plane of the substrate). In the third and fourth embodiments of the present invention, the modulation means 14 is preferably formed at least in part on the substrate containing one or more diffractive optical elements 12 with a plurality of electrodes being provided on the substrate for addressing each electrostatic actuator. The correlation spectrometer 10 according to the third and fourth embodiments of the present invention may further include addressing circuitry on the substrate connected to the plurality of electrodes for programming the grating to alternate between a plurality of grating states thereof.

According to the third embodiment of the present invention in FIG. 3*a*, the optical apparatus in the form of a correlation spectrometer 10 comprises a programmable diffraction grating 12 that is a reflection grating. The programmable diffraction grating 12 according to the third embodiment comprises a substrate 22 having a plurality of elongated grating elements 24 supported thereabove in a horizontal spaced relationship between adjacent grating elements, and at least one stationary electrode below each grating element for electrostatically activating the element (in combination with a moveable electrode on the element 24) for translatory motion thereof. (Translatory motion is defined herein as being uniform motion in a vertical dimension normal to the plane of the substrate.) Thus, the programmable diffraction grating 12 according to the third embodiment of the present invention comprises a plurality of electrostatic actuators, with each electrostatic actuator being formed by the combination of one or more stationary electrodes and an overlying grating element 24.

According to the third embodiment of the present invention, with examples thereof being shown in FIGS. 4–5 and 8–9, each grating element 24 comprises an elongate central portion 32 connected at each end thereof to at least one flexible member 34 for attachment to a support frame 36 surrounding the plurality of grating elements. The central portion 32 of each grating element 24 further includes a light-reflective upper surface. A programming voltage from the modulation means 14 in FIG. 3*a* may be applied between one or more stationary electrodes 30 and a moveable electrode thereabove (formed at least in part by the central portion 32) for electrostatically defining and controlling a plurality of grating states with each grating state being defined by a substantially planar vertical spaced relationship between each grating element 24 and adjacent grating elements.

The grating states so defined by the programmable diffraction grating 12 may be used to produce for one unit of time a first spectrum from the light 100, and to produce for a different unit of time a second spectrum of light being shifted in wavelength from the first spectrum. Thus, a single programmable diffraction grating 12 may be used to replace the pair of diffraction gratings (i.e. the first grating 12' and the second grating 12") required according to the first and second embodiments of the present invention.

In FIG. 3*a*, the substrate 22 preferably comprises a semiconductor such as (100) silicon, preferably when the programmable diffraction grating 12 is formed according to the art of micromachining; and most preferably when peripheral devices (e.g. addressing circuitry which is defined herein as any form of electronic circuitry for addressing the grating elements and supplying programming voltages thereto, and which may include feedback-control circuitry for controlling and maintaining a predetermined vertical spaced relationship of the grating elements) are formed on the substrate in addition to the stationary electrodes 30. However, for other embodiments of the present invention wherein such peripheral devices are not formed on the substrate, the substrate may comprise other materials including metals, glasses, ceramics, sapphire, diamond, fused silica, crystalline quartz, semiconductors, plastics, epoxy resins, or the like.

If the substrate 22 is electrically conductive, then a thin (e.g. a few microns or less) insulating layer 38 as shown in FIGS. 5 and 9 may be provided above the substrate for electrical isolation at least on part of the stationary electrodes 30. The insulating layer 38 may be formed on the substrate (e.g. as silicon dioxide, silicon nitride, polyimide, spin-on glass, or the like) by a deposition process; or the layer 38 may be formed by a chemical reaction with the underlying substrate (e.g. a thermal oxide of silicon formed on the surface of a silicon substrate). The insulating layer 38 may further be photolithographically patterned to provide electrical interconnections to the underlying substrate and/or peripheral devices located on the substrate.

Figure 4:
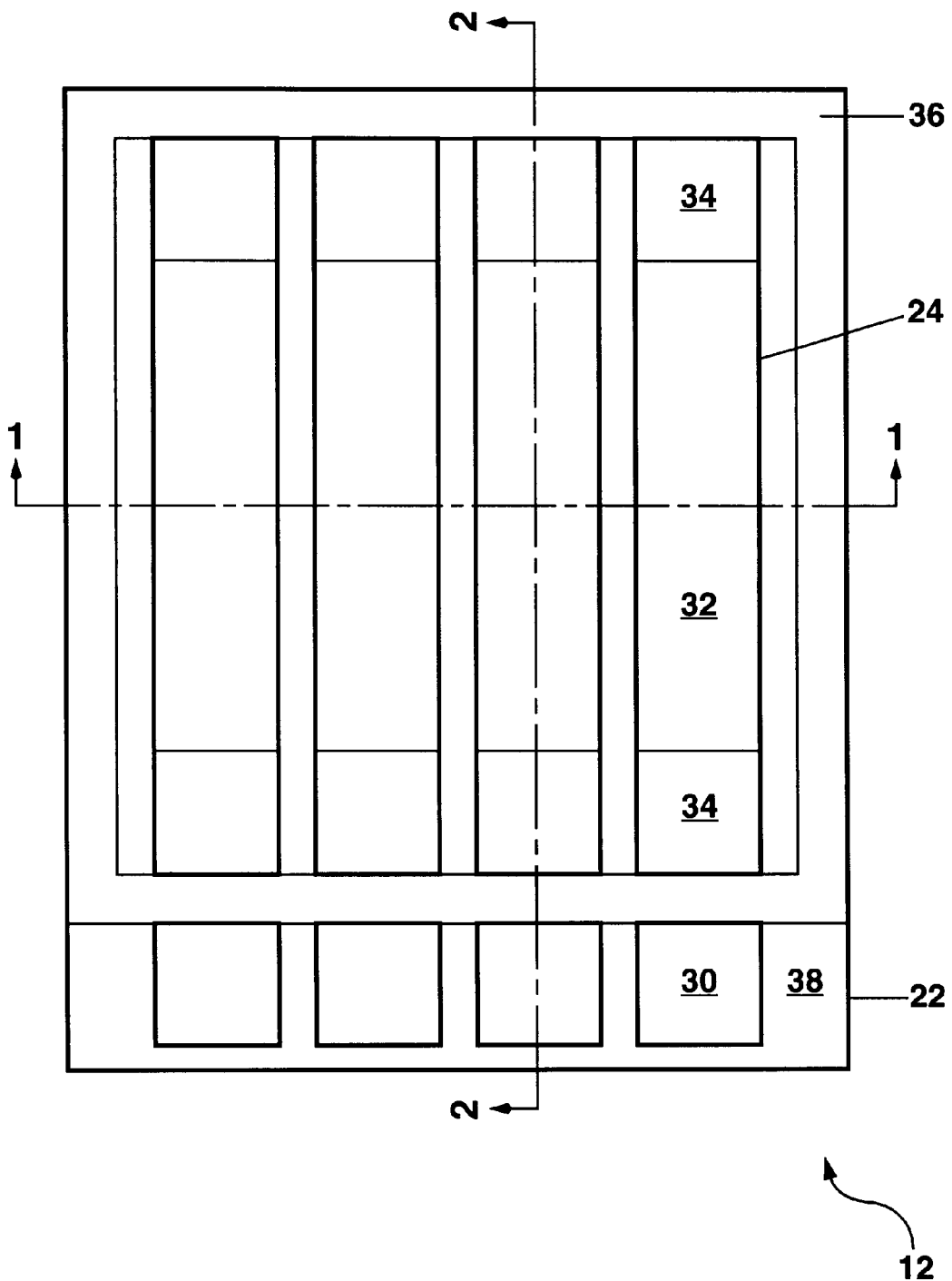
FIG. 4 shows a plan view of a first example of an electrically programmable diffractive optical element of the optical apparatus according to FIG. 3a for use in reflection.

The first example of the programmable diffraction grating 12 of FIGS. 4–5 for use in the correlation spectrometer 10 is preferably formed by a micromachining process as illustrated by way of the cross-section views presented in FIGS. 6 and 7. The diffraction grating 12 is preferably formed by fabricating a lower portion 60 as shown in FIG. 6 and an upper portion 70 as shown in FIG. 7, with the two portions being joined together to form the completed diffraction grating 12 as shown in the cross-section view of FIG. 5a.

Figure 6A:
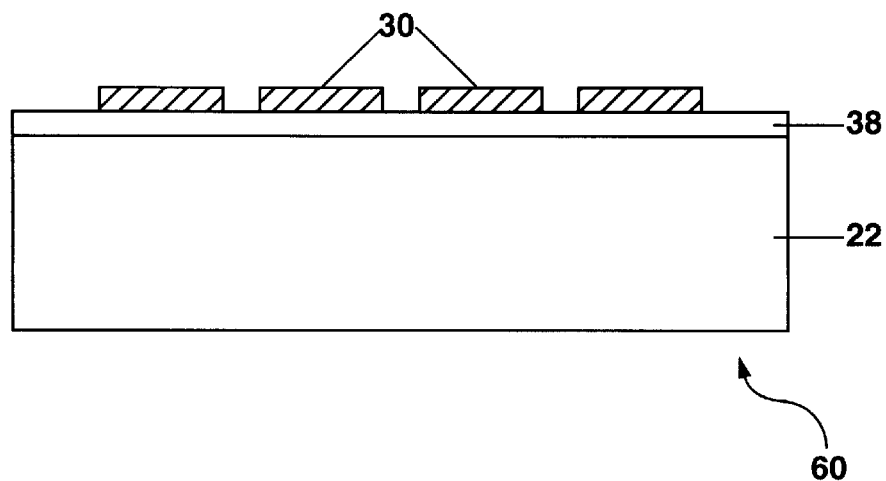
FIGS. 6a–b and FIGS. 7a–d are cross sections illustrating a preferred process for manufacturing the electrically-programmable diffractive optical element according to the first example of FIGS. 4–5.

FIG. 6a shows formation of a plurality of stationary electrodes 30 on the substrate 22 by a deposition or sputtering process. The stationary electrodes may be formed of any metal or metal alloy (e.g. aluminum, gold, tungsten, or the like; or alloys thereof) that may be photolithographically patterned to provide a horizontal spaced relationship substantially matching the spaced relationship of the overlying grating elements 24 in the completed device. The particular metal or metal alloy used for the electrodes will generally depend on the composition of the underlying substrate, and whether or not addressing circuitry is provided on the substrate. For example, when CMOS addressing circuitry is provided on a silicon substrate, the electrodes may be formed of aluminum or tungsten or alloys thereof to allow the electrodes to be formed by the same semiconductor processing steps used for interconnecting the CMOS devices forming the addressing circuitry. Thus, the stationary electrodes in some embodiments of the present invention may form a part of a multi-layer interconnect metallization.

A multi-layer metallization may also be preferred when more than one stationary electrode 30 is provided below each grating element 24. A plurality of stationary electrodes underlying each grating element may be preferred, for example, to provide for an accurate (i.e. substantially planar) translatory motion of each grating element while minimizing any deformation or tilting of the central portion thereof; or to include one or more sensory electrodes for capacitively sensing (in combination with the moveable electrode) the vertical position of each grating element and providing an electrical input to control circuitry within the addressing circuitry for maintaining and controlling the vertical spaced relationship between adjacent grating elements by means of a closed feedback loop. In these examples, a multi-layer metallization may be preferred for making electrical connections to the separate electrodes 30.

Figure 6B:
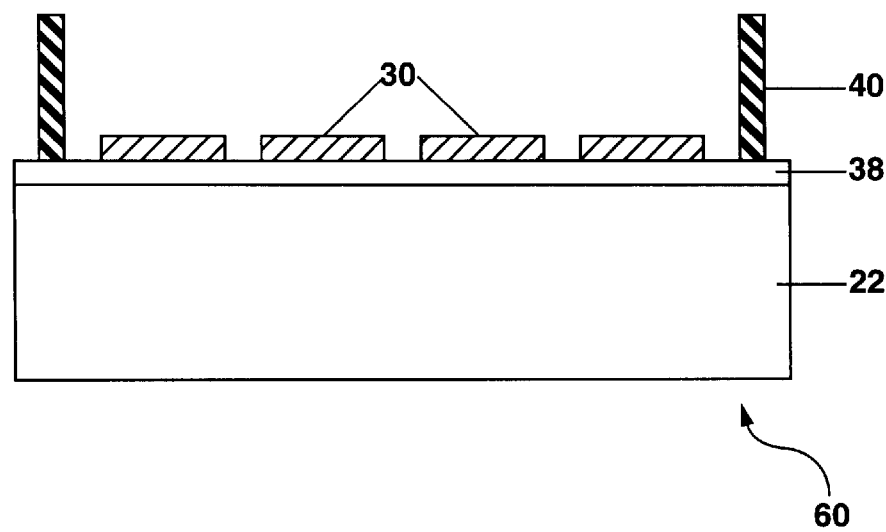

FIG. 6b shows formation of one or more support posts 40 that are provided for attachment of the upper portion 70 of FIG. 7 to the lower portion 60 of FIG. 6 for forming the completed programmable diffraction grating 12. The support posts 40 preferably comprise a metal or metal alloy (e.g. copper, gold, nickel, or the like) formed above the substrate preferably by initially depositing and patterning a thin seed layer of the metal or metal alloy and then forming the remainder of the support post by a metal plating process. In this manner, either a single annular support post being matched in size to the support frame 36 or a plurality of smaller square, rectangular, or otherwise shaped support posts may be formed. The exact shape and number of support posts for a particular embodiment of the present invention may depend on several factors including the number and size of stationary electrodes 30; whether or not the supports post also act as electrical interconnections between the moveable electrodes of the grating elements and one or more ground electrodes on the substrate, or to the substrate itself; and whether or not a passivation layer 42 is provided above the stationary electrodes 30 (as shown in FIG. 9) to protect and/or electrically isolate the stationary electrodes, at least in part. The height of the support posts 40 may be in the range of about 2 to 30 microns and will depend upon a wavelength range and an angle of incidence, $\theta_i$, of the light beams being processed by the device during operation thereof, in addition to the above factors. After the plating step, a mechanical or chemical-mechanical polishing step may be used to define an exact height for the support posts 40 and to planarize the top surfaces of the posts.

A process for forming the upper portion 70 of the first example of the programmable diffraction grating 12 is illustrated in FIGS. 7a–7d. The upper portion 70 is preferably formed according to the art of silicon micromachining.

Figure 7A:
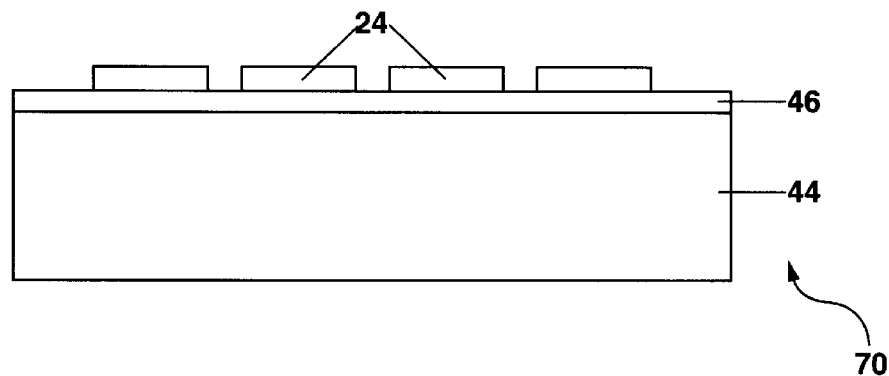

In FIG. 7a, a wafer 44 of a micromachineable material such as silicon is provided for later forming support frame 36 in the process step of FIG. 7c. A support layer 46 is formed on the wafer 44; and one or more grating layers are formed above the support layer.

The support layer 46 may comprise one or more layers of materials such as silicon dioxide (also termed oxide), silicon nitride (also termed nitride), or the like that are deposited above the wafer 44, or formed by a chemical reaction therewith. The support layer 46 is preferably formed so that any overall net stress within the layer 46 is tensile rather than compressive to prevent the possibility for buckling or fracture of the grating elements 24 during a subsequent etch release process wherein the support layer is etched away from the overlying grating elements to free the grating elements for translatory motion.

A silicon dioxide support layer 46 may be formed, for example, either by deposition or by growing a thermal oxide (i.e. silicon dioxide formed by a wet oxidation process) on an outer surface of a silicon wafer 44. To produce a net tensile stress in the support layer 46, the silicon dioxide is preferably overcoated with a layer of silicon nitride. Alternately, the support layer 46 may comprise silicon nitride.

The support layer 46 may have a thickness of up to about one micron, and is used to provide an etch stop during micromachining of the overlying grating layers for forming the grating elements 24. A smooth lower surface of each grating element may be preferred; and this in turn may lead to a preferred process for forming the support layer 46. Thus, it may be preferable to form a thermal oxide (i.e. silicon dioxide formed by thermally oxidizing the outer surface of a silicon wafer in the presence of moisture at a high temperature of about 1000° C.) support layer 46 on a polished silicon wafer 44 since the outer surface of the oxide layer will retain the smoothness of the silicon wafer.

One or more grating layers are formed above the support layer 46, with the grating layers comprising at least one micromachineable material selected from the group consisting of silicon (including polycrystalline silicon, also termed polysilicon), silicon dioxide, silicon nitride, and metals (e.g. aluminum, gold, silver, nickel, tungsten, and alloys thereof). Polysilicon and silicon nitride grating layers may be formed by a deposition process such as Low Pressure Chemical Vapor Deposition (LPCVD); silicon dioxide grating layers may be formed by deposition or by a thermal oxidation process (e.g. in a polysilicon grating layer); and the metal grating layers may be sputter deposited. The grating layers are used for formation of the elongate central portion or beam 32 of each grating element 24 and surrounding flexible members 34 at either end thereof by photolithographic patterning and micromachining steps for selectively removing portions of the grating layers and thereby defining the central portion and flexible members of the grating elements.

The thickness of the flexible members (i.e. springs) is preferably substantially smaller than the thickness of the central portion of the grating elements so that the flexible members are deformable during operation of the device while the central portion remains substantially planar (i.e. undeformed) while undergoing translatory motion as a rigid body. The ability of the central portion to remain substantially planar and rigid while the flexible members are deformable is made possible by the dependence of bending stiffness of a plate on the third power of its thickness. Thus, by providing a central portion that has, for example, three times the thickness of the flexible members, the rigidity of the central portion will be increased over that of the flexible members by a factor of 27.

The flexible members 34 may be formed by methods known to those skilled in the art of micromachining. For example, the flexible members 34 may have a leaf-spring structure as shown in FIGS. 4–5, with each flexible member being substantially planar with a thickness of about one-third or less of the thickness of the central portion of the grating elements.

As another example, the flexible members 34 may have an etch-stopped corrugated hinge structure formed by etching a plurality of parallel corrugations aligned substantially along a minor axis of the elongate element. Such a corrugated hinge structure may be formed by etching the corrugations into the exposed upper surface of the grating layers at the location of each flexible member, and then diffusing or ion implanting an etch-stop species (e.g. a boron impurity dopant diffused or ion implanted to an impurity concentration of about $5 \times 10^{19}$ cm$^{-3}$ or more into polysilicon through a native oxide mask) into the etched region for forming a corrugated etch-stop layer. Subsequent etching to remove the material underlying the etch-stop layer may be performed with a dopant-selective etchant such as ethylenediamine pyrocatechol, tetramethyl ammonium hydroxide, or the like that etches the unmodified and unmasked portions of the grating layers at a much higher rate than for the etch-stop layer and the support layer 46, thereby forming the corrugated hinge structure. (The formation of the flexible members 34 may proceed either by etching the grating layers from the exposed surfaces thereof during the process step of FIG. 7*a*; or during the later process step of FIG. 7*d* wherein the grating elements are released from contact with the support layer 46. Such a corrugated hinge structure may be advantageous for providing an increased range of translatory motion while providing an increased resistance to tilting of the central portion of the grating element about a major axis of the elongate element.

Alternately, one of the wafer 44, the support layer 46, or a first-formed grating layer (preferably comprising silicon dioxide) may be patterned and etched to provide a plurality of parallel corrugations therein aligned substantially along the minor axis of the elongate element, thereby forming a mold. Layers (including the hinge-forming grating layer) deposited above the mold may then conform to the shape of the mold forming the corrugated flexible members 34, with any material layers (e.g. the support layer 46 and/or silicon dioxide grating layer) between the wafer 44 and the corrugated flexible members 34 being removable selective etching (which may also be used for releasing the grating elements 24 as described hereinafter).

As yet another example, each flexible member 34 may comprise a pair of juxtaposed serpentine planar microsprings, with one end of each microspring preferably being attached near a corner of the central portion of the grating element, and the other end of each microspring being attached to the support frame 36 by support layer 46. Each serpentine planar microsprijng comprises a plurality of curved cantilever beams joined together end-to-end; and may have either a uniform beam width or a non-uniform beam width that progressively increases from a point of contact with the central portion outward to the point of contact with the support frame. Such juxtaposed serpentine planar microsprings, formed according to the art of micromachining, may also be advantageous for providing an increased range of translatory motion while providing an increased resistance to tilting of the central portion.

In FIG. 7*a*, the central portion 32 of the grating elements is similarly defined by photolithographic patterning and micromachining, with formation of the central portion generally occurring simultaneously with formation of the flexible members 34 (although the central portion may be masked during some of the process steps for forming flexible members comprising corrugated hinges or serpentine planar microsprings).

Figure 10:
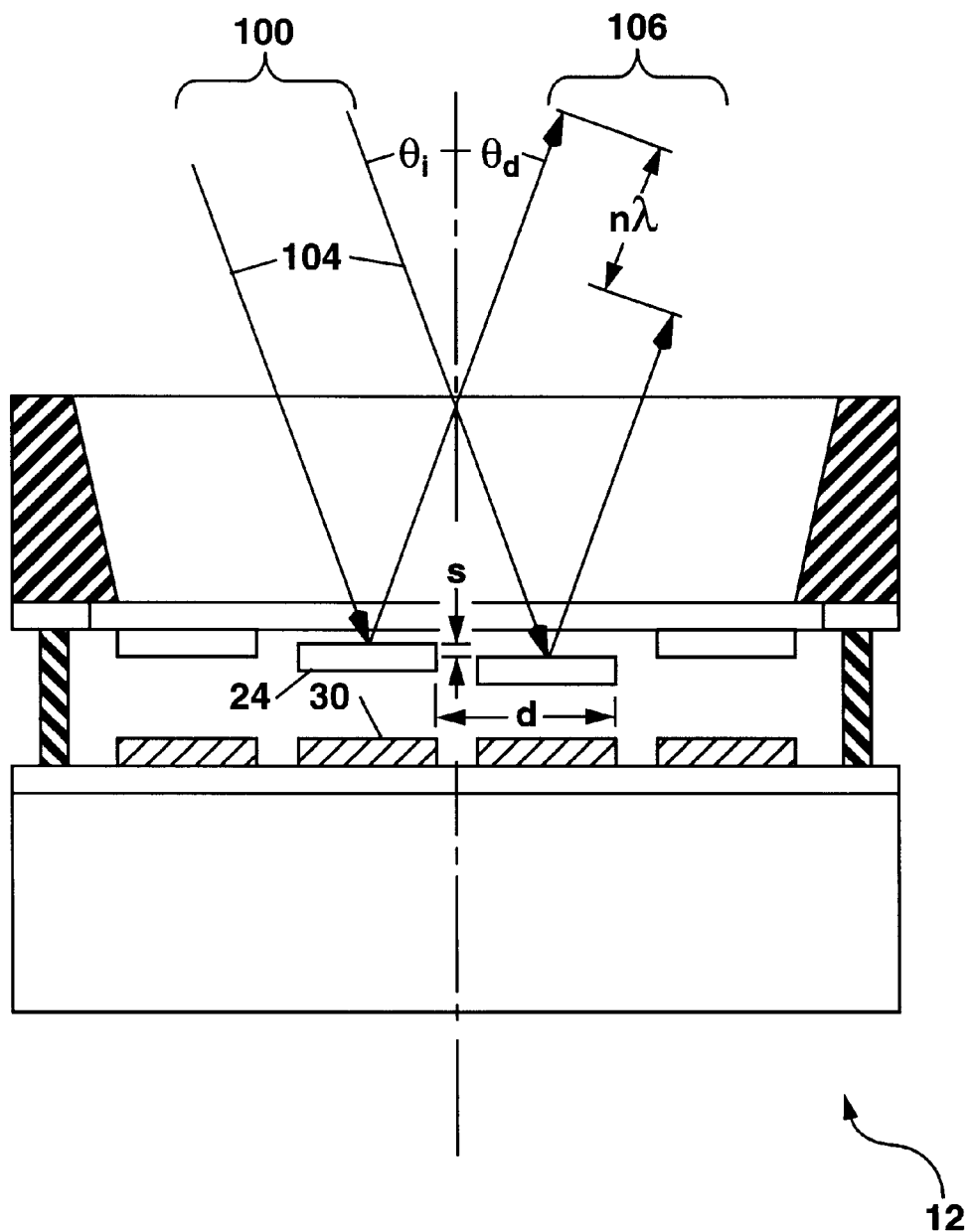
FIG. 10 illustrates operation of the electrically-programmable diffractive optical element for diffracting an incident beam of light.

The central portion of each grating element 24 is substantially rectangular in plan with adjacent grating elements preferably having substantially equal dimensions. Typical dimensions for each grating element may be, for example, as follows: the central portion 32 is rectangular with a width of about 2–10 microns, a thickness of about the width or smaller, and a length of up to about 100 microns or more. The spacing between adjacent grating elements is generally smaller than the width of the grating elements. For forming a diffractive optical element 12 according to the third embodiment that operates as a first-order diffraction grating, a periodicity, d, of the grating elements as shown in FIG. 10 is about equal to a wavelength of an incident light beam; whereas a device that operates as a higher-order diffraction grating may be formed with a periodicity, d, being larger than the wavelength of the light beam. (The programmable diffraction grating according to the third embodiment of the present invention may be programmed to form either a periodic grating or a multi-periodic grating depending upon predetermined grating states for operation of the apparatus 10.)The flexible members 34 surrounding the central portion 32 on each end thereof preferably have a width approximately equal to that of the central portion, a thickness of about one-third that of the central portion or less, and an overall length of about 10–40 microns.

Figure 7B:
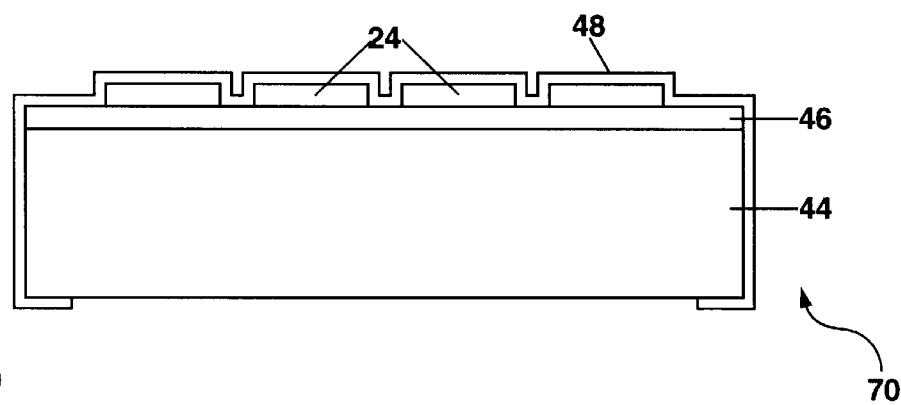

FIG. 7b shows a second process step for forming the upper portion 70 of the programmable diffraction grating. In FIG. 7b, a protective layer 48 of a material such as silicon nitride (e.g. stoichiometric or silicon-rich LPCVD silicon nitride, or the like) is formed over the exposed surfaces of the wafer 44, support layer 46, and grating elements 24 and patterned to expose the majority of the lower surface of the wafer for removal by etching. The protective layer 48 serves to protect the grating elements, support layer, and an annular outer portion of the wafer during a bulk micromachining process whereby majority of the wafer is etched away leaving the support frame 36. Tle protective layer 48 is preferably of a composition and thickness to provide a net lateral tensile stress for the combination structure formed by the protective layer, grating elements, and support layer when the majority of the wafer is removed during the bulk micromachining process so that the combination structure does not buckle or fracture as might possibly occur if the net stress were compressive.

Figure 7C:
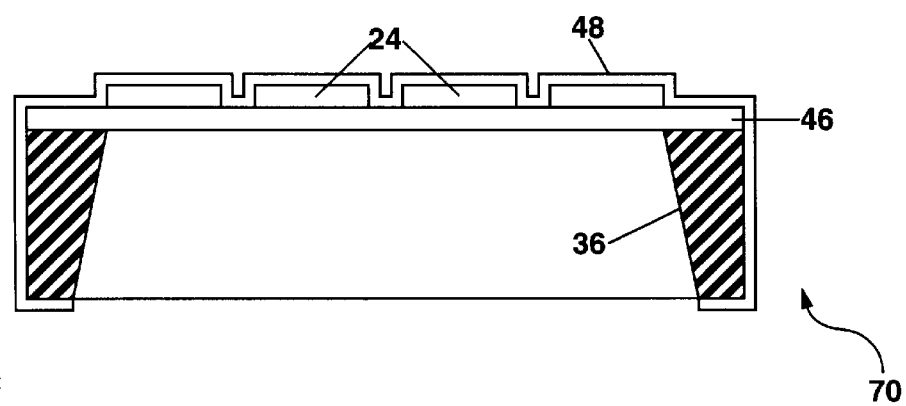

The bulk micromachining process as illustrated in FIG. 7c is preferably performed by contacting the exposed portion of the wafer 44 with an anisotropic etchant such as potassium hydroxide (KOH) or the like, with the protective layer 48 acting as an etch mask and the support layer 46 acting as an etch stop. The use of KOH as an anisotropic etchant generally forms sloping inner sidewalls for the support frame 36 by etching along (111) crystallographic planes as shown in FIG. 7c. These sloping sidewalls may be advantageous for increasing the angles of incidence and diffraction ($\theta_i$ and $\theta_d$, respectively) of the light beams during operation of the device, and for providing an improved optical access to the outermost grating elements.

Figure 7D:
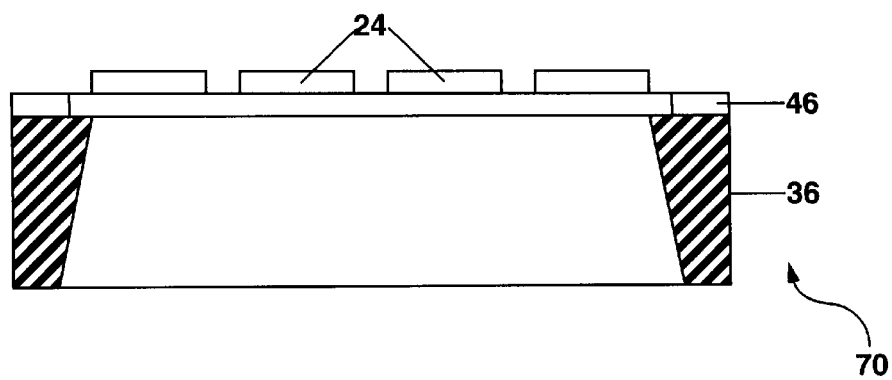

In the step of FIG. 7d, the protective layer 48 and the majority of the support layer 46 (except for an annulus supporting the grating elements by the flexible members thereof) are removed thereby releasing the grating elements 24 for movement thereof. In FIG. 7d, the order of release of the grating elements is important, especially when the support layer 46 is a thermal oxide which is typically in compression. In this case, the oxide support layer 46 is preferably removed first by etching with hydrofluoric acid (HF) which leaves the grating elements with a smooth mirror-like surface for later forming the light-reflective upper surface of the completed device. After removal of the oxide support layer 46, the protective layer 48 (e.g. silicon nitride) may be removed by etching. Complete removal of the protective layer 48 may be performed by using a wet etchant with controlled gentle agitation to prevent breakage of the fragile grating elements; or otherwise a dry etching method such as plasma etching may be used to selectively remove the protective layer on the grating-element side of the upper portion 70. The use of a dry etching process may be advantageous for removing the protective layer 48 from over the grating elements 24 while protecting the smooth mirror-like surface below the grating elements from possible plasma-induced damage since stringer portions of the protective layer may remain on the sides of the grating elements.

To complete formation of the upper portion 70, the grating elements 24 may be coated with a thin metal layer (e.g. aluminum, gold, silver, nickel, tungsten or alloys thereof) having a thickness of about 50–100 nanometers or more that is deposited on the lower surface of the grating elements in FIG. 7d for forming, at least in part, the moveable electrode (the moveable electrode may be further defined by an impurity doped region of the grating elements), for electrically connecting the moveable electrode to a conductive support frame 36 (or to an annular ground electrode formed on the remaining portion of the support layer 46), and/or for forming the light-reflective upper surface. (It should be noted that the lower surface of the grating elements in FIG. 7d becomes the light-reflective upper surface of the grating elements in the completed device of FIG. 5a.) The particular metal to be deposited may be selected to provide a high reflectance over a particular wavelength range of operation of the device. In some embodiments of the present invention, the material (i.e. grating layers) underlying the overcoated metal layer may then be completely removed beyond the central portion 32 so that the remaining metal layer forms the flexible member 34. Such a metal flexible member 34 may replicate the shape of the removed material, forming a planar leaf-spring, corrugated hinge, or a pair of serpentine planar microsprings.

The grating elements 24 are preferably permanently electrically grounded to minimize any electrostatic interaction or electrical interference therebetween, and to allow the elements to be spaced as closely together as desired, short of causing frictional interference during translatory motion thereof. Such electrical grounding may be, for example, to an electrically conductive support frame 36, or to an annular ground electrode surrounding the plurality of grating elements.

The programmable diffraction grating 12 according to the third embodiment of the present invention is formed by attaching the upper portion 70 to the lower portion 60 as shown in FIG. 5a. The portions (60 and 70) may be aligned by means of alignment features patterned and etched into the remaining portion of the support layer 46 for receiving the support posts 40, or by means of metal pads formed on the exposed surface of the support layer at locations corresponding to the support posts. The portions (60 and 70) may be attached by an adhesive, solder, thermocompression bonding, or diffusion bonding. For thermocompression or diffusion bonding a suitable metal or metal alloy such as gold, nickel or the like may be deposited upon the support posts 40 and used for the metal pads to aid in bonding the portions (60 and 70).

Electrical connections (e.g. from the modulation means 14) to the programmable diffraction grating may be made by wire bonds to a plurality of bonding pads interconnected to the stationary electrodes and to the moveable electrodes. In embodiments of the present invention having addressing circuitry formed on the substrate prior to attachment of the upper portion 70, the stationary electrodes may be connected directly to the addressing circuitry, with one or more electrical inputs being provided to a serial or parallel interface of the addressing circuitry for operation of the programmable diffraction grating.

Figure 8:
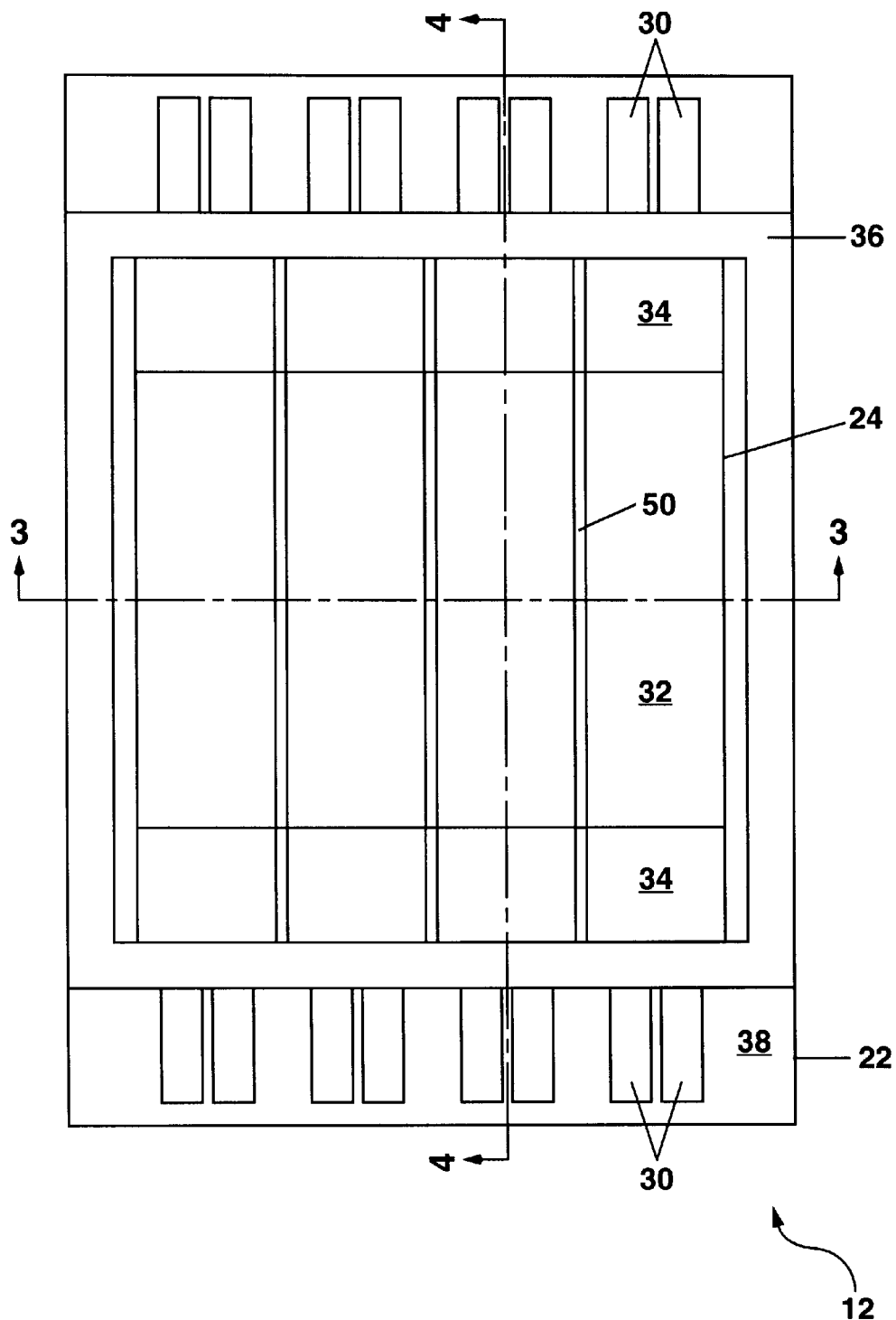
FIG. 8 shows a plan view of a second example of an electrically-programmable diffractive optical element of the optical apparatus according to FIG. 3a for use in reflection.

According to a second example of the present invention as shown in the plan view of FIG. 8 and in the cross-section views of FIG. 9, the support posts 40 may provide for an electrical interconnection between the moveable electrodes and a ground electrode on or above the substrate. In the second example, guard electrodes 50 are also provided between each pair of stationary electrodes 30, with the guard electrodes preferably being located to intercept the central portion 32 of the grating elements after a predetermined range of motion thereof. The guard electrodes may be formed by depositing an electrically-conductive material such as the metal or metal alloy used for formation of the support posts 40. Formation of the guard electrodes may include deposition of a thin patterned seed layer and subsequent metal plating thereon. (The process steps for forming the guard electrodes may occur at least partially concurrent with the formation of the support posts 40, although separate masking and plating steps may be used to provide for a larger height of the plated support posts.)

A primary function of the grounded guard electrodes 50 is to reduce the possibility for any electrostatic interaction or cross-talk between each grating element and adjacent stationary electrodes not directly underlying the grating element. A secondary function of the guard electrodes 50 in a preferred embodiment thereof is to form stops for limiting the range of translatory motion of the grating elements to a stable operating range and for preventing contact of the grating elements with one or more stationary electrodes therebelow which may result in stiction and/or a shorting out the programming voltage applied between the grating element and the stationary electrodes.

In the second example of the programmable diffraction grating in FIGS. 8 and 9, four stationary electrodes 30 are provided below each grating element, with the stationary electrodes being overcoated, at least in part, by a passivation layer 42 (e.g. silicon dioxide, silicon nitride, polyimide, spin-on glass, or the like) for environmental protection and/or for electrical isolation. The passivation layer 42 may be patterned to provide openings for defining the locations of the support posts 40 and the guard electrodes 50. (In the absence of guard electrodes 50 protruding into the path of the grating elements and forming stops, such stops may be formed by patterning the passivation layer 42 and forming a plurality of outward protrusions therein below the grating elements to limit travel and to prevent stiction.)

By independently addressing the four electrodes underlying each grating element with separate programming voltages (e.g. from the modulation means 14 or addressing circuitry operating in response to the modulation means), the parallelism of each grating element may be adjusted to overcome any deflection (e.g. rotation or tilting) of the central portion 32 that might otherwise arise from irregularities or nonuniformities within the grating element (especially from slightly mismatched flexible members) during selection of a grating state. The exact programming voltages necessary for operation of each grating element over a range of translatory motion thereof for providing a plurality of grating states may be determined (e.g. from an optical measurement of a diffraction pattern generated by a focused light beam reflected from the grating element and adjacent elements) and stored (within a memory portion of the addressing circuitry or an external memory) as a calibration set (or as a calibration function from which the programming voltages may be calculated to provide a predetermined range of translatory motion) for recall and use in selecting the grating states during operation of the device.

In other embodiments of the present invention, additional stationary electrodes 30 may be provided below the central portion of the grating elements as sensory electrodes for capacitively sensing the position (i.e. vertical spaced relationship) of each grating element. The sensory electrodes may be connected to control circuitry (e.g. included as a part of the addressing circuitry) for providing a closed feedback loop for accurately controlling and/or adjusting the vertical spaced relationship between adjacent grating elements in the programmable diffraction grating for configuring the grating elements 24 in at least two grating states.

The programmable diffraction grating 12 may further be packaged within an enclosure having a light-transmissive window (preferably with anti-reflection coatings for the wavelength range of operation of the device) above the grating elements for environmental protection of the device. Such an enclosure may also be advantageous for controlling the pressure of an ambient atmosphere (e.g. an inert gas such as $N_2$, Ar, etc.) surrounding the plurality of grating elements to aid in damping any modes of oscillation of the grating elements that may arise from irregularities therein (e.g. slightly mismatched flexible members) or from abrupt variations in the programming voltages during alteration of the vertical spaced relationship of one or more grating elements.

Operation of the electrically-programmable diffraction grating is illustrated in FIG. 10 for the first example thereof. During operation of the programmable grating within the correlation spectrometer, each grating element 24 may be translated vertically with respect to the underlying stationary electrode 30 by applying a programming voltage between the stationary and moveable electrodes (e.g. from the modulation means 14 connected to the addressing circuitry), thereby forming an air gap capacitor with opposite electrical charges being induced on each electrode to generate an electrostatic force of attraction that acts to move the grating element downward towards the stationary electrode.

In FIG. 10, light rays 104 from the incident light beam 100 may be received onto the light-reflective upper surfaces of a plurality of the grating elements and reflected therefrom. (Although FIG. 10 illustrates operation of the device for only two adjacent grating elements, in actual operation of the device a large number of grating elements will be involved for receiving the incident light beams and generating diffracted beams.) The reflected light rays travel over different paths to and from the grating elements, thereby producing a phase shift between the light rays which leads to the formation of a diffracted light beam 106.

As shown in FIG. 10, the light rays reflected from any two adjacent grating elements will be in phase when the vertical spaced relationship, s, between the two grating elements satisfies the modified grating equation:

$$d(\sin\theta_i + \sin\theta_d) + s\left(\frac{1}{\cos\theta_i} + \frac{1}{\cos\theta_d}\right) = n\lambda$$

where d is the periodicity of the grating elements, $\theta_i$ is the angle of incidence of the light beam 100 (as measured from the normal to the substrate 22), $\theta_d$ is the angle of diffraction of the light beam 106 reflected off the grating, n is an integer, and $\lambda$ is the wavelength of the light beam. It should be noted that the non-planarity of the grating elements for a grating state gives rise to the additional term dependent on the vertical spaced relationship, s, which is not present in the grating equation presented heretofore for a substantially planar arrangement of the grating elements. It should also be noted that a programmable diffraction grating such as that of the third embodiment of the present invention has applications for forming other types of spectrometers including wavelength-scanning spectrometers since the diffracted light beam 106 may be scanned in angle (i.e. the angle of diffraction, $\theta_d$, may be varied in a stepped or continuous manner) by addressing in sequence a plurality of grating states each with a slightly different value of the vertical spaced relationship, s, between adjacent grating elements. (It should also be noted that the programmable diffraction grating allows any particular starting wavelength to be accessed in a matter of a few milliseconds without the need to scan through a range of intermediate wavelengths.) Furthermore, by providing a grating state for the first spectrum having a multi-periodic grating profile as shown in the example of FIG. 12*a*, two or more preselected wavelengths of light may be provided with a substantially equal angle of diffraction, $\theta_d$ for increasing the sensitivity of the correlation spectrometer 10.

The vertical spaced relationship, s, for a plurality of grating elements defining each grating state may be predetermined according to the above equation, with the programming voltages required for alternately addressing the grating states being provided by the modulation means 14, the addressing circuitry or by external programming means such as a computer connected to addressing circuitry on the substrate 22 (or to bonding pads on the substrate interconnected to the plurality of stationary and moveable electrodes). One or more calibration sets of predetermined programming voltages may also be stored digitally within a memory portion of the addressing circuitry (or within the external programming means) and retrievable therefrom for generating the programming voltages (e.g. by a digital-to-analog converter included in the addressing circuitry) for moving the grating elements into one or more predetermined grating states (each grating state being selectable by instructions stored within the memory or provided by the modulation means or other external programming means) during operation of the correlation spectrometer.

The programming voltages may vary in the range of about 0–50 volts or more depending on the vertical spacing between the grating elements 24 and the underlying stationary electrodes 30, and the programmed translation distance for a particular grating element. The modulation means 14 in some embodiments of the present invention may further provide a small alternating-current component to the programming voltages at a predetermined modulation frequency for dithering the vertical position of the grating elements to generate a modulated feedback signal from the sensory electrodes or to generate a modulation component within the diffracted light beam for use in synchronous detection thereof.

The range of programming voltages required for operation of a particular grating element 24 will in general depend on the compliance of the flexible members 34 of the grating elements and also on the predetermined range of translatory motion. If the flexible members of a particular grating element are made longer or thinner or narrower or a combination thereof, the translatory motion of the grating element may be increased for a particular value of the programming voltage (or alternately a reduced programming voltage may be used to provide a specified range of translatory motion), since the compliance of the flexible member varies linearly with the inverse of the width and directly with the square of its length and inversely with the cube of its thickness. Thus, a range of programming voltages may be predetermined that are compatible with integrated circuits for forming the addressing circuitry on the same substrate as the grating elements, thereby greatly reducing the number and complexity of external connections to the programmable diffraction grating.

The range of translatory motion for the grating elements may be divided into a stable range of motion, and an unstable range of motion. The stable range of motion for each grating element is limited to about one-third of the distance between the untranslated position (i.e. the rest position at zero programming voltage) of the grating element and the position of contact with the underlying stationary electrode(s). For this stable range of motion, the electrostatic force of attraction between each grating element and underlying stationary electrode(s), which increases nonlinearly as the grating element approaches the stationary electrode, is balanced by the restoring force of the flexible members which varies approximately linearly with distance. Thus, over the stable range of motion, each grating element may be translated by a vertical distance that is directly proportional to the magnitude programming voltage, with the translatory motion being variable and controllable (albeit nonlinear with the applied programming voltage). Either analog or digital operation of the grating elements is possible within the stable range of motion. Furthermore, in some embodiments of the present invention the programmable diffraction grating may be restricted to operation within the stable range of motion by setting the height of stops at one-third or less of the distance between the untranslated position of the grating elements and the underlying stationary electrodes, or by limiting the programming voltages to a value below a collapse voltage for which motion of the grating elements becomes unstable.

When the grating elements are translated beyond the stable range of motion the ever-increasing force of attraction overcomes the restoring force, with the movement of the grating element becoming unstable and the grating element quickly being forced into contact with the stationary electrode (or preferably with a stop thereabove). This instability limits the grating elements to digital operation within the unstable range of motion, with each grating element being either in the untranslated position or in a stop position (defined by a stop such as a guard electrodes 50 or the passivation layer 42 into which the central portion of the grating element is brought into contact when the programming voltage is greater than or equal to the collapse voltage).

The vertical spaced relationship, s, between adjacent grating elements may be determined according to the above equation. In order to provide for the translation of a large number of grating elements each being spaced by an amount s while at the same time restricting the motion to the stable range, it should be noted that the position of any grating element may be shifted by an amount that produces a change of $\lambda$ or a multiple thereof difference in an optical path length of the diffracted light rays 106. Such a difference in optical path length may be produced by an upward or downward change in the vertical spaced relationship, s, between adjacent grating elements of an integral multiple of $$\lambda \frac{\cos\theta_i \cos\theta_d}{\cos\theta_i + \cos\theta_d}.$$

Thus, any grating element that must otherwise be translated beyond the stable range of motion may be shifted upwards by an amount as given above so that an overall range of translatory motion for the grating elements need not exceed a distance larger than $\lambda/2$. Due to the periodicity on the translatory motion imposed by a periodic phase relationship of the diffracted light rays some embodiments of the present invention may have stationary electrodes that are interconnected at regular intervals to reduce the number of different programming voltages required for operation of the device (such regular interconnections may also be used when the range of translatory motion is limited to discrete values as may occur, for example, when a four-bit digital to analog converter is used to provide the programming voltages).

According to the fourth embodiment of the present invention in FIG. 3b, the optical apparatus in the form of a correlation spectrometer 10 comprises an electrically-programmable diffraction grating 12 that may be either a transmission grating (as shown in FIG. 3b) or a resection grating (not shown). The diffractive optical element 12 according to the fourth embodiment comprises a substrate 22 having a deflectable member further comprising a plurality of elongate grating elements 24 in a support frame 36.

The deflectable member is attached to a plurality of material layers (e.g. grating layers) on the substrate by a pair of torsion hinges 50 to provide for an angular deflection or rotation of the grating elements upon electrostatic actuation. (Angular deflection is defined herein as being a rotary motion about an axis that is parallel to a major axis of each of the elongate grating elements.) At least one stationary electrode 30 is provided on the substrate below the grating elements to form in combination with another electrode contacting the grating elements at least one electrostatic actuator for addressing the diffractive optical element 12 and selecting between at least two grating states thereof, each grating state being defined by a different angle of deflection of the grating elements as measured from a normal to the plane of the substrate.

The programmable diffraction grating 12 according to the fourth embodiment of the present invention is preferably formed according to the art of micromachining as disclosed, for example, in U.S. Pat. Nos. 4,229,732; 5,061,049; and 5,311,360 which are incorporated herein by reference.

An example of a transmissive diffractive optical element 12 formed according to the fourth embodiment of the present invention is shown in plan view in FIG. 11a and in cross-section view in FIG. 11b. The substrate 22 preferably comprises a semiconductor such as (100) silicon, and most preferably when peripheral devices (e.g. addressing circuitry) are formed on the substrate. For other embodiments of the present invention not including such peripheral devices, the substrate may comprise other materials including metals, glasses, ceramics, sapphire, diamond, fused silica, crystalline quartz, semiconductors, plastics, epoxy resins, or the like.

If the substrate is electrically conductive, a thin insulating layer 38 (e.g. silicon dioxide, silicon nitride, polyimide, spin-on glass, etc.) may be provided above the substrate as shown in FIG. 11b for electrical insulation at least in part of the stationary electrodes 30, with formation of the insulating layer being by a deposition or thermal oxide process. The insulating layer 38 may further be photolithographically patterned to provide for interconnections to the underlying substrate and/or peripheral devices formed on the substrate.

The stationary electrodes 30 in FIG. 11 are preferably formed by deposition or sputtering, and may comprise a metal or metal alloy of aluminum, gold, tungsten, or the like. The stationary electrodes are preferably overcoated with a thin (about 0.1–1 μm) passivation layer 42 (e.g. silicon dioxide, silicon nitride, polyimide, spin-on glass, or the like) for electrical isolation. In some embodiments of the present invention, a thicker passivation layer 42 may be provided with patterning of the layer for forming stops above each electrode 30 for limiting the angular deflection of the grating elements 24 and preventing stiction.

A spacer layer 52 is formed above the passivation layer 42 with a thickness of up to a few microns for defining a range of angular deflection of the grating elements 24. The spacer layer 52 preferably comprises a material that is different from adjacent layers 42 and 54; and may be, for example, a photoresist, polyimide, spin-on glass, metal, silicon dioxide, silicon nitride, or a combination thereof. The primary requirements for the spacer layer 52 are that it have a smooth upper surface for formation of the grating elements 24 and surrounding support frame 36, and that it be removable under the grating elements to release the elements for electrostatic deflection thereof. Additionally, the spacer layer 52 is preferably formed so that any overall net stress within the layer 52 is tensile rather than compressive to prevent the possibility for buckling or fracture of the grating elements 24 during a subsequent release process wherein the spacer layer is removed by etching or chemical dissolution to free the overlying grating elements for angular deflection.

One or more grating layers are formed above the spacer layer 52 for forming the deflectable member, with the grating layers comprising at least one micromachineable material such as polycrystalline silicon, silicon dioxide, silicon nitride, or metal layers (e.g. aluminum, gold, silver, nickel, tungsten, or alloys thereof). The outermost grating layer above the grating elements may form a light reflective upper surface, especially for embodiments of the present invention wherein the diffractive optical element 12 is a reflection grating.

The grating layers according to the fourth embodiment of the present invention are used for forming the deflectable member (i.e. the grating elements 24 and surrounding support frame 36) and the torsion hinges 50. The elongate grating elements 24 of the transmission grating 12 of FIG. 11 are formed by providing a patterned etch mask above the layers and etching through the layers to form a plurality of rectangular slots 54 (either straight or tapered through the deflectable member) separating the grating elements and to define the surrounding support frame 36. According to this embodiment of the present invention, the deflectable member is preferably substantially rigid for rotation as a unit.

The torsion hinges 50 preferably have a thickness that is smaller than that of the grating elements and support frame. For example, the torsion hinges 50 may be formed from only a single of the grating layers (e.g. the outermost grating layer which may be a metal layer), with the remaining grating layers removed below the torsion hinges by selective etching. As another example an etch-stop species (e.g. boron) may be diffused or ion-implanted through a patterned mask into a last-formed polysilicon grating layer to a predetermined depth for defining the torsion hinges 50. In a subsequent etch step, the un-implanted or un-diffused portions of the grating layers underlying the torsion hinges may be removed with a dopant-selective etchant as described heretofore. In other embodiments of the present invention, the torsion hinges 50 may comprise, at least in part, a first-formed grating layer. The dimensions of the torsion hinges 50 are selected according to the size of the deflectable member to provide a predetermined range of angular deflection thereof for selecting between at least two grating states.

The formation of the torsion hinges 50, at least in part, from an electrically conductive material such as a metal or doped semiconductor (e.g. polysilicon) is important for providing a moveable electrode on the deflectable member for addressing (in combination with one or more stationary electrodes 30) the grating elements and selecting between at least two grating states including a first grating state being electrically selectable for a unit of time for receiving and processing the light to produce a first spectrum including at least a portion of the spectral signature of one or more materials of interest, and a second grating state being selectable for a different unit of time for receiving and processing the light to produce a second spectrum shifted in wavelength from the first spectrum. Electrically-conductive torsion hinges 50 are also advantageous for providing an electrical interconnections between the moveable electrode and one or more ground electrodes on the substrate, or to the substrate itself.

In the example of FIG. 11, the torsion hinges 50 are shown centered about an axis 56 of the deflectable member so that the deflectable member may be rotated either in a clockwise direction about the axis 56 as shown in FIG. 11c, or in a counter-clockwise direction depending on how the stationary electrodes 30 are addressed. In other embodiments of the present invention, the deflectable member may be rotated about an axis that is located near an outer edge of the deflectable member so that there is only one preferred direction of rotation.

For forming a transmission grating 12 as shown in FIG. 11, an aperture 58 is preferably formed through the substrate 22 to minimize transmission losses of the light 100. (When a transmission grating is formed as shown in FIG. 11 with openings through the deflectable member and substrate, the transmission of the light 100 is maximized and the need for anti-reflection coatings is eliminated.) The aperture 58 may be formed, for example, by a bulk micromachining process (e.g. with KOH) as described heretofore with one or more of the layers 38, 30, 42, or 52 acting as an etch stop. After formation of the aperture, any remaining portions of the layers 38, 30, 42, and 52 underlying the deflectable member may be removed by etching to release the deflectable member. This final etch step may proceed either from the substrate or grating layer sides of the diffractive optical element 12.

Operation of the correlation spectrometer according to the fourth embodiment of FIG. 3b is similar to that described heretofore, with the grating states being selectable by programming voltages (0–50 volts or more) applied by the addressing circuitry to one or more of the stationary electrodes. For a fixed spaced relationship of the grating elements and fixed angles of incidence and diffraction, any angular deflection of the grating elements acts to change the wavelength of light transmitted by the diffractive optical element 12 of FIG. 11. Thus, a plurality of grating states may be defined by different angles of deflection of the diffractive optical element 12. A first grating state may be formed, for example, from the deflectable member being in an undetected position as shown in FIG. 11b; and the first grating state may be accessed by grounding each of the stationary electrodes 30 (with the moveable electrode also being grounded). A second grating state may then be defined by applying a programming voltage to one of the stationary electrodes (with the other stationary electrode in FIG. 11 preferably being electrically grounded) to electrostatically actuate the programmable diffraction grating and bring the support member 36 into contact with the underlying passivation layer 42 as shown in FIG. 11c. Alternately, the first and second grating states may be defined by the deflectable member being in a position of maximum clockwise and counterclockwise rotation, respectively; with each grating state being selectable by applying a programming voltage to one of the stationary electrodes and electrically grounding the other stationary electrode.

There have been shown several embodiments of a correlation spectrometer comprising one or more diffractive optical elements formed on a substrate for alternately producing for one unit of time a first spectrum of processed light including at least a portion of the spectral signature of one or more materials of interest, and producing for a different unit of time a second spectrum of the dispersed light being shifted in wavelength from the first spectrum. An enclosure may be provided for enclosing, at least in part, elements of the invention (e.g. the diffractive optical elements) for increasing a signal-to-noise ratio of the output signal from the detector means.

Other applications and variations of the correlation spectrometer will become evident to those skilled in the art. For example, other embodiments of micromachined diffractive optical elements 12 may be formed with a pair of grating states selectable by alternately heating and cooling the grating elements, thereby altering the horizontal spaced relationship (i.e. the periodicity) of the diffractive optical element due to a thermal expansion of the material (e.g. silicon) forming the grating elements. Such a thermally-modulated diffractive optical element may be formed, for example, by providing a periodic current flow through the grating elements 24 or a thin-film heater underlying a the grating elements to heat the grating elements for addressing one grating state; and then allowing the elements to cool in the absence of any current flow to address the other grating state.

Other embodiments of the optical apparatus 10 according to the present invention may be provided as optical processors for use in optical computing, optical information processing, and optical communications. A primary distinction between these embodiments of the present invention is that the incident light does not interact with one or more materials of interest (i.e. the incident light does not contain information about materials to be analyzed); but is instead impressed (before entering the optical apparatus) with a spectral signature in the form of a plurality of channels of optical information, with the optical apparatus acting to process the channels of optical information to provide a correlation function, a multiplexing function, a demultiplexing function or the like for correlating, combining, or separating the channels of optical information. In these optical processor embodiments of the present invention, the incident light may be received by optical means as described heretofore and directed therefrom to each diffractive optical element; and the processed light may be further directed to one or more points in space wherein one or more slits, apertures, optical fibers, or detector means may be located. (Since each diffractive optical element 12 in the apparatus is a reciprocal element, a single incident beam of light may be received by the optical apparatus to generate one or more processed and/or detected light beams; or alternately the functionality of the optical processor may be reversed to receive a plurality of incident light beams and therefrom generate a single processed and/or detected light beam as an output of the apparatus.)

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. Optical apparatus for processing incident light from a source, comprising:
   (a) at least one diffractive optical element formed on a substrate and comprising a plurality of elongate grating elements within each diffractive optical element, the grating elements having a multi-periodic spaced relationship with a plurality of different periodicities and a varying height of adjacent grating elements, each diffractive optical element for a unit in time receiving and processing light; and
   (b) modulation means comprising an addressing element in the form of an electro-mechanical actuator further comprising a motor coupled to a pair of the diffractive optical elements for alternately moving each of the pair of diffractive optical elements into a path of the light for receiving the light at a preselected fixed angle of incidence, thereby addressing each diffractive optical element to produce for one unit of time a first correlation with the light, and to produce for a different unit of time a second correlation with the light that is different from the first correlation.

2. Optical apparatus for processing incident light from a source comprising:
   (a) at least one diffractive optical element formed on a substrate and comprising a plurality of elongate grating elements within each diffractive optical element, the grating elements having a multi-periodic spaced relationship with a plurality of different periodicities and a varying height of adjacent grating elements, each diffractive optical element for a unit in time receiving and processing light; and
   (b) modulation means comprising at least one addressing element in the form of an electrostatic actuator which programs each diffractive optical element between at least two grating states thereof for addressing each diffractive optical element to produce for one unit of time a first correlation with the incident light, and to produce for a different unit of time a second correlation with the incident light that is different from the first correlation.

3. The optical apparatus in claim 2 wherein the electrostatic actuator is formed at least in part on the substrate containing each diffractive optical element.

4. The optical apparatus in claim 3 further including a plurality of electrodes on the substrate for addressing the electrostatic actuator.

5. The optical apparatus in claim 4 further including addressing circuitry on the substrate connected to the plurality of electrodes.

6. Optical apparatus for processing incident light from a source, comprising:
   a plurality of pairs of diffractive optical elements in the form of an array on a substrate, each diffractive optical element comprising elongate grating elements in a multi-periodic spaced relationship with a plurality of different periodicities and a varying height of adjacent grating elements and each diffractive optical element in a particular pair for a unit in time receiving and process light;
   (b) modulation means comprising light-beam deflector for addressing each diffractive optical element in the particular pair to alternately produce for one unit of time a first correlation with the incident light, and to produce for a different unit of time a second correlation with the incident light that is different from the first correlation; and
   (c) selection means for selecting the particular pair of diffractive optical elements from among the array.

7. The optical apparatus in claim 6 wherein the modulation means for addressing each diffractive optical element includes at least one addressing element selected from the group consisting of electro-mechanical actuators, electrostatic actuators, and light-beam deflectors.

8. A correlation spectrometer for analyzing at least one material of interest comprising:
   (a) a first diffractive optical element for intercepting and processing for one unit of time light from a source having impressed thereon a spectral response characteristic of each material of interest, the first diffractive optical element receiving the light at a preselected fixed angle of incidence and processing the light to produce a first spectrum including at least a portion of the spectral response characteristic of each material of interest;
   (b) a second diffractive optical element for receiving the light at the preselected fixed angle of incidence and processing the light for a different unit of time to produce a second spectrum shifted in wavelength from the first spectrum;
   (c) detector means for receiving the light and generating an output signal therefrom; and
   (d) modulation means for addressing each of the diffractive optical elements for intercepting the light.

9. The correlation spectrometer in claim 8 further including signal processing means for receiving the output signal from the detector means and recovering information about each material of interest.

10. The correlation spectrometer in claim 8 wherein the first and second diffractive optical elements are formed on a common substrate.

11. The correlation spectrometer in claim 10 wherein the substrate comprises a substrate material selected from the group consisting of metals, glasses, ceramics, sapphire, diamond, fused silica, crystalline quartz, semiconductors, plastics, and epoxy resins.

12. The correlation spectrometer in claim 8 wherein at least one of the diffractive optical elements includes a light-reflective upper surface comprising a metal layer.

13. The correlation spectrometer in claim 8 wherein the modulation means includes at least one addressing element selected from the group consisting of electro-mechanical actuators, electrostatic actuators, and light-beam deflectors.

14. The correlation spectrometer in claim 13 wherein each addressing element is an electro-mechanical actuator comprising a motor coupled to each diffractive optical element for alternately moving each diffractive optical element into and out of a path of the light.

15. The correlation spectrometer in claim 13 wherein each addressing element is a light-beam deflector for coupling the light alternately to the first and second diffractive optical elements.

16. The correlation spectrometer in claim 8 further including selection means for selecting the first and second diffractive optical elements from a plurality of pairs of diffractive optical elements in the form of an array.

17. The correlation spectrometer in claim 8 wherein the plurality of pairs of diffractive optical elements forms an analysis atlas with each pair of diffractive optical elements being programmed for analysis of the spectral signature of a different preselected material of interest.

18. A correlation spectrometer for analyzing at least one material of interest by means of light from a source having impressed thereon a spectral signature due to interaction of the light with each material of interest, the correlation spectrometer comprising at least one diffractive optical element formed on a substrate and comprising within each diffractive optical element a plurality of independently addressable grating elements with adjacent adjacent grating elements being independently moveable relative to each other and configurable in at least two grating states including a first grating state selectable for an unit of time for receiving and processing the light to produce a first spectrum including at least a portion of the spectral signature of each material of interest, and a second grating state selectable for a different unit of time for receiving and processing the light to produce a second spectrum shifted in wavelength from the first spectrum.

19. The correlation spectrometer in claim 18 further including detector means for receiving the light and generating an output signal therefrom.

20. The correlation spectrometer in claim 19 further including signal processing means for receiving the output signal from the detector means and recovering information about each material of interest.

21. The correlation spectrometer in claim 18 wherein the substrate is silicon.

22. The correlation spectrometer in claim 18 further including addressing circuitry for providing a plurality of programming voltages to the grating elements for configuring the elements in at least two grating states.

23. The correlation spectrometer in claim 22 wherein the addressing circuitry is located at least in part on the substrate.

24. The correlation spectrometer in claim 22 wherein each programming voltage includes an alternating-current component having a predetermined modulation frequency.

25. A correlation spectrometer for analyzing at least one material of interest by means of light from a source having impressed thereon a spectral signature due to interaction of the light with each material of interest, the correlation spectrometer comprising:
(a) at least one diffractive optical element formed on a substrate and comprising a plurality of grating elements hinged for translatory motion, with at least one electrode on the substrate for addressing the grating elements and selecting between at least two grating states including a first grating state selectable for a unit of time for receiving and processing the light to produce a first spectrum including at least a portion of the spectral signature of each material of interest, and a second grating state being selectable for a different unit of time for receiving and processing the light to produce a second spectrum shifted in wavelength from the first spectrum.

26. The correlation spectrometer in claim 25 further including detector means for receiving the light and generating an output signal therefrom.

27. The correlation spectrometer in claim 26 further including signal processing means for receiving the output signal from the detector means and recovering information about each material of interest.

28. The correlation spectrometer in claim 25 wherein the substrate comprises a substrate material selected from the group consisting of metals, glasses, ceramics, sapphire, diamond, fused silica, crystalline quartz, semiconductors, plastics, and epoxy resins.

29. The correlation spectrometer in claim 25 wherein the substrate is silicon.

30. The correlation spectrometer in claim 25 further including addressing circuitry for providing at least one programming voltage to the diffractive optical element for selecting between the at least two grating states.

31. The correlation spectrometer in claim 30 wherein the addressing circuitry is located at least in part on the substrate.

32. The correlation spectrometer in claim 30 wherein each programming voltage includes an alternating-current component having a predetermined modulation frequency.

33. A correlation spectrometer for analyzing at least one material of interest by means of light from a source having impressed thereon a spectral signature due to interaction of the light with each material of interest, the correlation spectrometer comprising:
(a) at least one diffractive optical element formed on a substrate and comprising a plurality of grating elements hinged for angular motion of the grating elements about an axis parallel to a major axis of each of the grating elements and further having at least one electrode on the substrate for addressing the grating elements and selecting between at least two grating states thereof including a first grating state selectable for a unit of time for receiving and processing the light to produce a first spectrum including at least a portion of the spectral signature of each material of interest, and a second grating state being selectable for a different unit of time for receiving and processing the light to produce a second spectrum shifted in wavelength from the first spectrum.

34. The correlation spectrometer in claim 33 further including detector means for receiving the light and generating an output signal therefrom.

35. The correlation spectrometer in claim 34 further including signal processing means for receiving the output signal from the detector means and recovering information about each material of interest.

36. The correlation spectrometer in claim 33 wherein the substrate comprises a substrate material selected from the group consisting of metals, glasses, ceramics, sapphire, diamond, fused silica, crystalline quartz, semiconductors, plastics, and epoxy resins.

37. The correlation spectrometer in claim 33 wherein the substrate is silicon.

38. The correlation spectrometer in claim 33 further including addressing circuitry for providing at least one programming voltage to the diffractive optical element for selecting between the at least two grating states.

39. The correlation spectrometer in claim 38 wherein the addressing circuitry is located at least in part on the substrate.

40. The correlation spectrometer in claim 38 wherein each programming voltage includes an alternating-current component having a predetermined modulation frequency.

* * * * *